United States Patent
Sheldon et al.

(10) Patent No.: US 9,836,599 B2
(45) Date of Patent: Dec. 5, 2017

(54) IMPLICIT PROCESS DETECTION AND AUTOMATION FROM UNSTRUCTURED ACTIVITY

(71) Applicant: Microsoft Technology Licensing, LLC, Redmond, WA (US)

(72) Inventors: Graham Andrew Michael Sheldon, Bellevue, WA (US); Sedat Gokalp, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 154 days.

(21) Appl. No.: 14/657,646

(22) Filed: Mar. 13, 2015

(65) Prior Publication Data
US 2016/0267268 A1 Sep. 15, 2016

(51) Int. Cl.
  *G06F 21/00* (2013.01)
  *G06F 21/55* (2013.01)
  *G06Q 10/06* (2012.01)

(52) U.S. Cl.
  CPC ....... *G06F 21/554* (2013.01); *G06Q 10/0635* (2013.01)

(58) Field of Classification Search
  None
  See application file for complete search history.

(56) References Cited

U.S. PATENT DOCUMENTS

| 7,849,048 | B2 | 12/2010 | Langseth et al. |
| 8,209,204 | B2 | 6/2012 | Adler et al. |
| 8,266,148 | B2 | 9/2012 | Guha et al. |
| 8,812,651 | B1* | 8/2014 | Eriksen ................ H04L 45/745 709/224 |
| 8,887,286 | B2* | 11/2014 | Dupont .................. G06F 21/00 726/25 |
| 2004/0024720 | A1* | 2/2004 | Fairweather ........... G06F 8/427 706/46 |
| 2004/0049473 | A1* | 3/2004 | Gower ................... G06Q 10/06 706/46 |
| 2005/0108256 | A1 | 5/2005 | Wakefield et al. |
| 2006/0184410 | A1 | 8/2006 | Ramamurthy et al. |
| 2007/0011134 | A1* | 1/2007 | Langseth .......... G06F 17/30563 |
| 2007/0011741 | A1* | 1/2007 | Robert ................... H04L 43/00 726/22 |

(Continued)

OTHER PUBLICATIONS

Desai, et al., "Process Trace Identification from Unstructured Execution Logs" In Proceedings of IEEE International Conference on Services Computing. Jul. 5, 2010, 8 pages.

(Continued)

*Primary Examiner* — Maung Lwin
(74) *Attorney, Agent, or Firm* — Christopher J. Volkmann; Kelly, Holt & Christenson, PLLC

(57) ABSTRACT

An unstructured event is detected and an unstructured event record is generated for the detected event. Case identifier (ID) conflation is performed to estimate a case ID that corresponds to the detected event, and event type identification is performed to estimate a type of the unstructured event. A business process model is applied to the unstructured event record, to identify a process that the unstructured event is related to. A user experience is generated based upon the event type, the case ID, and the corresponding process identified for the detected event.

20 Claims, 18 Drawing Sheets

(56) References Cited

U.S. PATENT DOCUMENTS

| | | | | |
|---|---|---|---|---|
| 2009/0018983 | A1* | 1/2009 | El-Rafei | G06F 11/0715 706/12 |
| 2009/0157653 | A1* | 6/2009 | Herlocker | G06F 17/30867 |
| 2010/0107252 | A1* | 4/2010 | Mertoguno | G06F 21/55 726/23 |
| 2010/0114899 | A1* | 5/2010 | Guha | G06F 17/30867 707/741 |
| 2012/0151272 | A1* | 6/2012 | Behrendt | G06F 9/542 714/39 |
| 2013/0132385 | A1* | 5/2013 | Bullotta | G06F 17/30283 707/736 |
| 2014/0201838 | A1* | 7/2014 | Varsanyi | H04L 63/1425 726/23 |
| 2014/0310235 | A1* | 10/2014 | Chan | G06F 17/30598 707/603 |
| 2015/0019513 | A1* | 1/2015 | Dey | G06F 17/30613 707/692 |

OTHER PUBLICATIONS

Lundberg, Alan, "Leverage Complex Event Processing to Improve Operational Performance", In Business Intelligence Journal, vol. 11, No. 1, Jun. 2006, pp. 55-65.

Yang, et al., "A System Architecture for Manufacturing Process Analysis based on Big Data and Process Mining Techniques", In Proceedings of IEEE International Conference on Big Data, Oct. 27, 2014, pp. 1024-1029.

Aalst, el al., "Finding Structure in Unstructured Processes: The Case for Process Mining", In Proceedings of Seventh International Conference on Application of Concurrency to System Design, Jul. 10, 2007, 10 pages.

Aalst, W.M.P. Van Der, "Business Alignment: Using Process Mining as a tool for Delta Analysis and Conformance Testing Tools", In Journal of Requirements Engineering, vol. 10, Issue 3, Aug. 19, 2005, pp. 198-211.

Bose, et al., "Trace Clustering based on Conserved Patterns: Towards Achieving Better Process Models", In Proceedings of International VVorkshops on Business Process Management, Sep. 7, 2009, 12 pages.

Rozinat, et al., "Conformance Testing: Measuring the Fit and Appropriateness of Event Logs and Process Models", In Proceedings of the Third international conference on Business Process Management, Sep. 5, 2006, 74 pages.

Goedertiera, et al., "Process Discovery in Event Logs: An application in the Telecom Industry", In Proceedings of Applied Soft Computing, vol. 11, No. 2, Mar. 2011, pp. 17-24.

* cited by examiner

IMPLICIT PROCESS DETECTION AND AUTOMATION FROM UNSTRUCTURED ACTIVITY

BACKGROUND

Computing systems are currently in wide use. Some organizations employ a wide variety of different types of computing systems and applications, in order to perform operations or tasks for the organization.

For example, many organizations have a variety of different communication systems. They can include electronic mail systems, messaging systems, social or business network systems, telephonic, cellular or other similar communication systems, etc. In addition, the same organization may have organization-specific applications that allow users to perform tasks. Some such applications can include customer relations management systems, enterprise resource planning systems, document management systems, meeting and calendar systems, etc. Such computing systems can include a wide variety of other systems as well.

People who work for the organization may use many or all of these applications in order to perform a wide variety of different types of tasks. Many of the tasks are unstructured. For instance, a workflow within a CRM system may have a pre-defined structure. However, at a given step within that workflow, a user may perform other, unstructured steps. For instance, during a workflow that generates a quote from an opportunity, the user may send emails, perform information retrieval queries, engage in research on social or business networks, or other things, in an unstructured way, in order to obtain information.

The discussion above is merely provided for general background information and is not intended to be used as an aid in determining the scope of the claimed subject matter.

SUMMARY

An unstructured event is detected and an unstructured event record is generated for the detected event. Case identifier (ID) conflation is performed to estimate a case ID that corresponds to the detected event, and event type identification is performed to estimate a type of the unstructured event. A business process model is applied to the unstructured event record, to identify a process that the unstructured event is related to. A user experience is generated based upon the event type, the case ID, and the corresponding process identified for the detected event.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
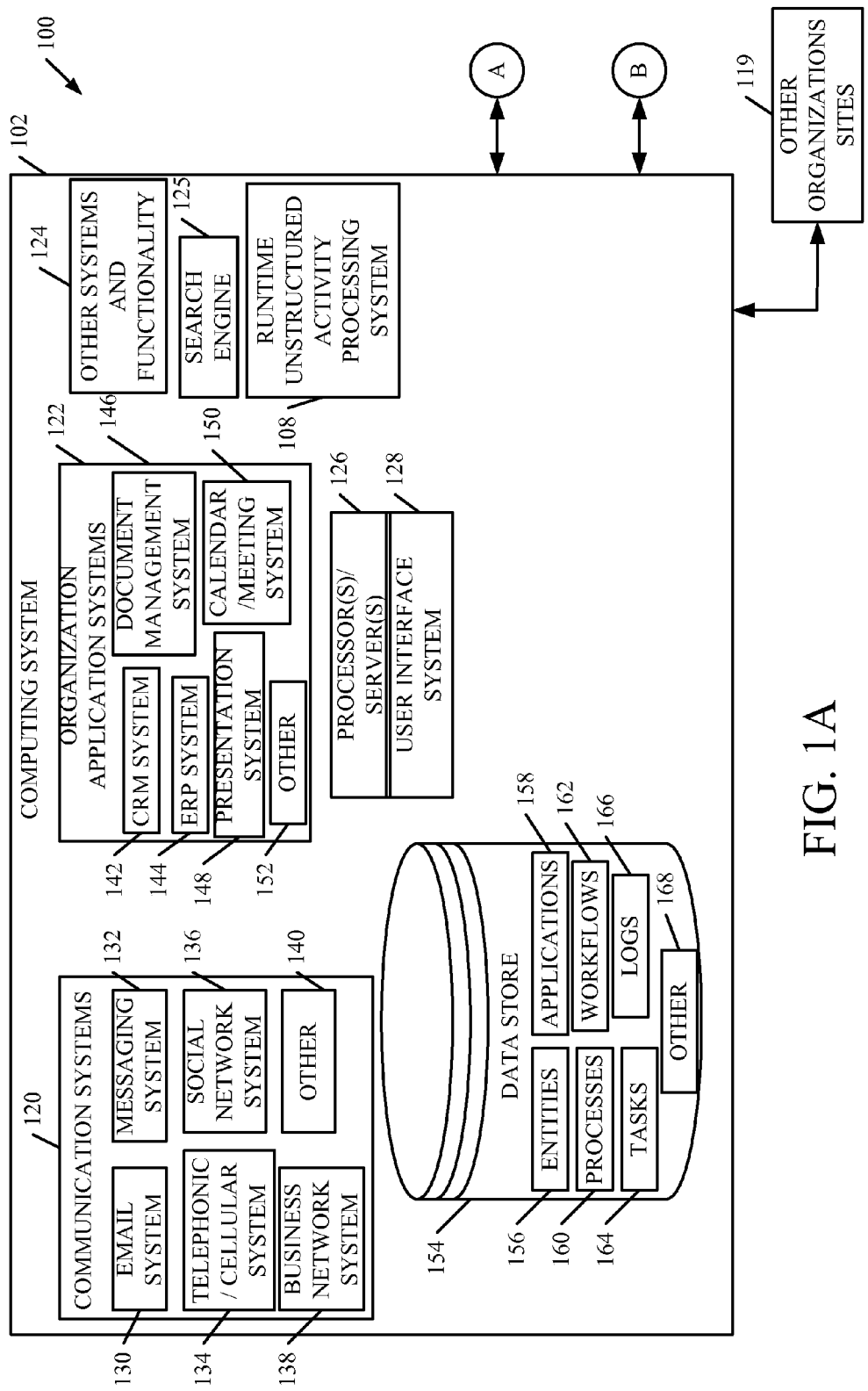
FIGS. 1A and 1B (collectively referred to herein as FIG. 1) show a block diagram of one example of a computing system architecture.

For purposes of the present discussion, a structured event is one that occurs according to a predefined workflow within an application of a computing system. It already has a predefined event type and is already, and automatically, associated with a set of related, structured events within an application. It can be associated with the other structured events, for example, by a case identifier (or case ID). It will be noted that, for purposes of the present discussion, a case ID is used to identify a data record, such as an entity or other record, or a set of related entities or records. It is not to be confined to meaning only an identifier for a support incident.

An unstructured event, on the other hand, is not automatically associated with a process or workflow in the computing system. It is not automatically assigned a case ID. A case within a computing system is a set of related structured and unstructured events. They are illustratively related because they have to do with a same external organization, a same user, or a same issue, etc.

Some employees or users of computing systems at an organization often perform unstructured tasks, sometimes according to patterns. For instance, when performing a structured workflow within a computing system, a user may, at certain points within that workflow, send an electronic mail message to a set of recipients. As an example, when a potential customer goes to a website of an organization to inquire about a product of the organization, the customer may fill out a form. Within the computing system of the organization that receives the form, a lead may automatically get created in a structured way. The lead may be provided to a user who carries out a sales workflow. During the sales workflow, the user may consistently perform a first step which involves sending an email to the potential customer asking a few basic questions. In that scenario, the step of creating a lead based on a potential customer filling out a form is created in a structured way, within the computing system. It is assigned a case ID. However, when the user sends out the email to the potential customer, that is technically outside of the sales workflow, and therefore it is unstructured and often not captured by the computing system executing the workflow.

There are a wide variety of different types of scenarios where users perform unstructured activities, often even within a structured workflow. The unstructured activities are not captured by the computing system, and therefore this can result in inefficient performance. Similarly, the user may deviate from their normal pattern and this may generate unwanted results. For instance, if a user consistently responds to customer inquiries by performing a certain set of steps, and that generates positive results, it may be that the user inadvertently skips one of those steps. These types of anomalies in unstructured activity are not detected by the computing system, because the unstructured activities are not captured, are not given an event type or case ID, and are therefore not monitored for conformance by the computing system.

Figure 1B:
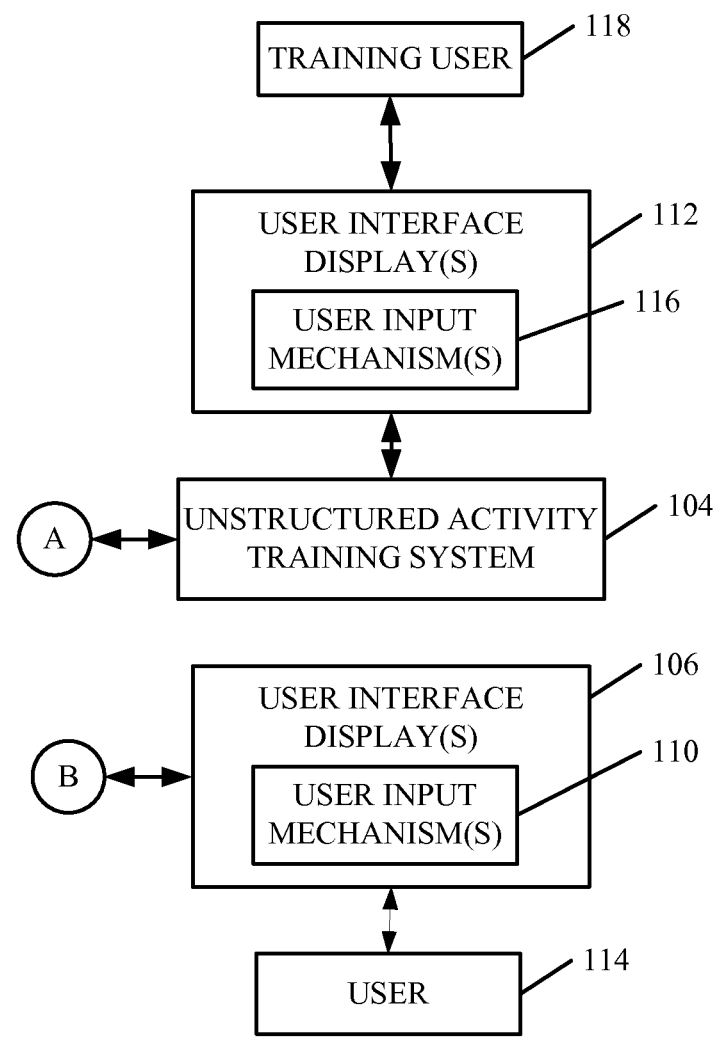

FIGS. 1A and 1B (collectively referred to herein as FIG. 1) show a block diagram of one example of a computing system architecture 100. Computing system architecture 100 illustratively includes computing system 102 that has access to unstructured activity training system 104. Architecture 100 also shows that, in one example, system 102 generates user interface displays 106 with user input mechanisms 110 for interaction by user 114. User 114 can interact with the mechanisms 110 to control and manipulate system 102. Training system 104 illustratively generates user interface displays 112 with user input mechanisms 116 for interaction by training user 118. User 118 can illustratively interact with mechanisms 116 to control and manipulate system 104. Architecture 100 also contemplates that system 102 may have access to (or be accessed by) computing systems of other organizations, or other websites 119.

Computing system 102 is illustratively a computing system that is used by an organization. Therefore, it can have a wide variety of different systems deployed within it. For instance, it can have communication systems 120, organization application systems 122, other systems and functionality 124, search engine 125 and data store 154. It also illustratively has a set of processors or servers 126 and a user interface component 128.

Communication systems 120 can include, for instance, email systems 130, messaging systems 132, telephonic/cellular systems 134, social network systems 136, business network systems 138 or a wide variety of other communication systems 140. Organization application systems 122 illustratively run organization applications. They can be server side applications and can, themselves, include customer relations management (CRM) systems 142, enterprise resource planning (ERP) systems 144, document management systems 146, presentation systems 148, calendar/meeting systems 150, and a wide variety of other systems 152. Any or all of the systems in computing system 102 can access data store 154.

Data store 154 can include entities 156, applications 158, processes 160, workflows 162, tasks 164, logged data 166 which may include process logs, or a wide variety of other logged information, and it can include other items 168. Entities 156 illustratively represent items within computing system 102, or within the various applications in computing system 102. For instance, a vendor entity may describe and define a vendor. A meeting entity may describe and define a scheduled meeting. An email entity may describe and define an electronic mail message. A quote entity may describe and define a quote. A business opportunity entity may describe and define a business opportunity. The entities can represent documents within the various applications in system 102. They can represent events, or they can represent other items. This is only a small example of the wide variety of different type of entities that can comprise entities 156. The various application systems 122 illustratively run applications 158, which, themselves, can run processes 160, workflows 162, and perform tasks 134. In doing so, they can operate on entities 156.

Through all of the various user interactions with system 102, runtime unstructured activity processing system 108 illustratively detects user interactions (or other unstructured events) and identifies and extracts information based on those detected interactions or events. It will be noted that the interactions are unstructured interactions, such as email sent through email system 130, other messaging communications (e.g., using a mobile device such as a tablet or smart phone) through messaging system 132, or telephonic/cellular system 134, or interactions with social network system 136 or business network system 138. They can also be search results based on automatic or user initiated searches conducted by search engine 125. Of course, these are only examples of different types of interactions that can be detected as unstructured events. System 108 identifies the type of unstructured event and a particular process, entity, document, etc. that it relates to and can generate or modify a user experience based on it.

A scenario may be helpful to illustrate the nature of unstructured events. Assume for the sake of the present discussion that user 114 is using one of the applications in ERP system 144 to perform a recruiting process by which user 114 is attempting to recruit and hire an employee. The recruiting process may involve a predefined recruiting workflow that has a number of tasks. The tasks may result in the user 114 or the system 102 performing various structured events. However, it may also be that, during that predefined workflow or process, user 114 also performs a number of unstructured tasks or events. As an example, the recruiting process may be initiated by an external candidate at an organization 119 submitting a resume to the organization using system 102. Receiving the resume at a recruiting application within ERP system 144 may be captured as a structured event. A recruiter may then screen the resumes and send one or more of them to user 114. The recruiter may then schedule a telephone screening interview. If the recruiter replies with positive results from that interview, then user 114 may email a technology screener who may meet by telephone interview, with the candidate and provide electronic mail feedback. User 114 may then read that feedback and ask clarifying questions. User 114 may also send electronic mail to the recruiter with the user's standard list of interview personnel that user 114 may wish to conduct interviews. The recruiter may then schedule the interview. User 114 may then send an electronic mail to the interviewers, with their role in the interviewing process and a document with the job description. The interviewers may submit feedback by filling out a relevant feedback form. User 114 may then send a note to the recruiter to move forward with an offer, and the recruiter may prepare an offer in a formal document.

In this entire recruiting process, it may be that there are only a small number of structured events. They may include, for instance, receiving the resume, having the technology interviewers submit feedback on a pre-defined form, scheduling interviews, and preparing a formal offer document. Therefore, it is only these events that are captured by ERP system 144. All of the other activity may be unstructured activity or represent unstructured events, and therefore may never be captured by ERP system 144. However, in one example, runtime unstructured activity processing system 108 captures all of the activity and events. It can use models that are trained by training system 104 to identify the type of event that each detected event represents, as well as a case identifier for the detected item which indicates a particular case number or other case identifier within computing system 102 that the detected event corresponds to. System 108 can then illustratively conduct a suitable user experience with user interface displays 106 and user input mechanisms 110 for user 114.

In capturing the unstructured activity, processing system 108 illustratively detects patterns in the unstructured activity (such as sequences of operations, words or topics used in various documents, electronic mail transmissions, the inclusion of various different people, the inclusion of various different documents, etc.). System 108 also illustratively identifies that an unstructured event or a pattern of unstructured activity relates to a process 160 or workflow 162 within computing system 102. This can be done based on contacts, customers, words or topics, recipients or attendees, etc. System 108 can also identify anomalies in the patterns or unstructured activity that have been detected. It can trigger a workflow or a user experience to respond to the anomalies in those patterns. It can, for instance, send alerts or reminders to user 114. It can suggest or automatically include recipients of messages on a message template opened for the user. It can show a particular process object, from systems 122, in the proper context, etc. All of these are described in greater detail below. Training system 104, that performs training of models used in system 108, will first be described, and then the operation of runtime system 108 will be described.

Figure 2A:
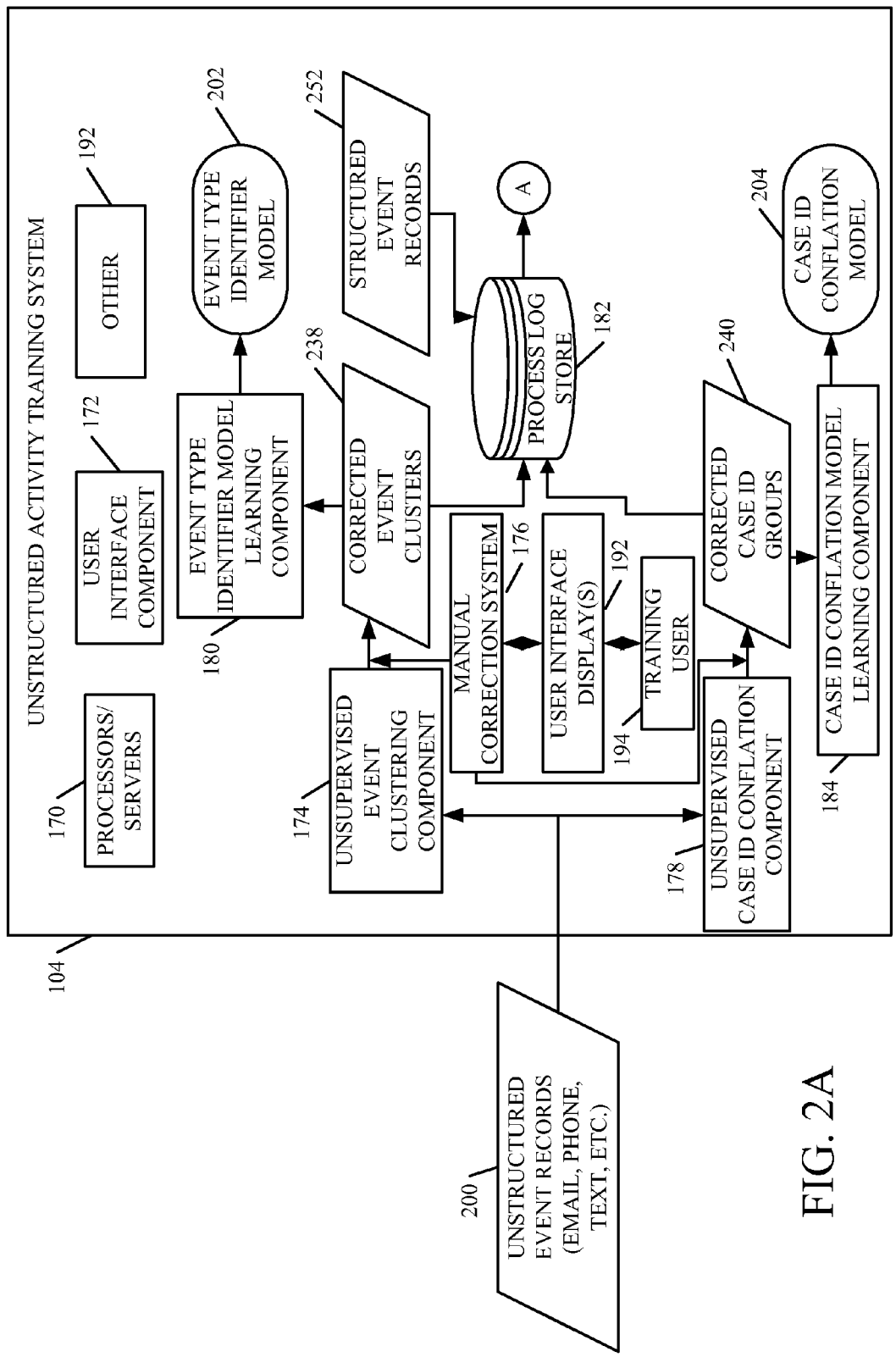
FIGS. 2A and 2B (collectively referred to herein as FIG. 2) show a more detailed block diagram of one example of an unstructured activity training system.
Figure 2B:
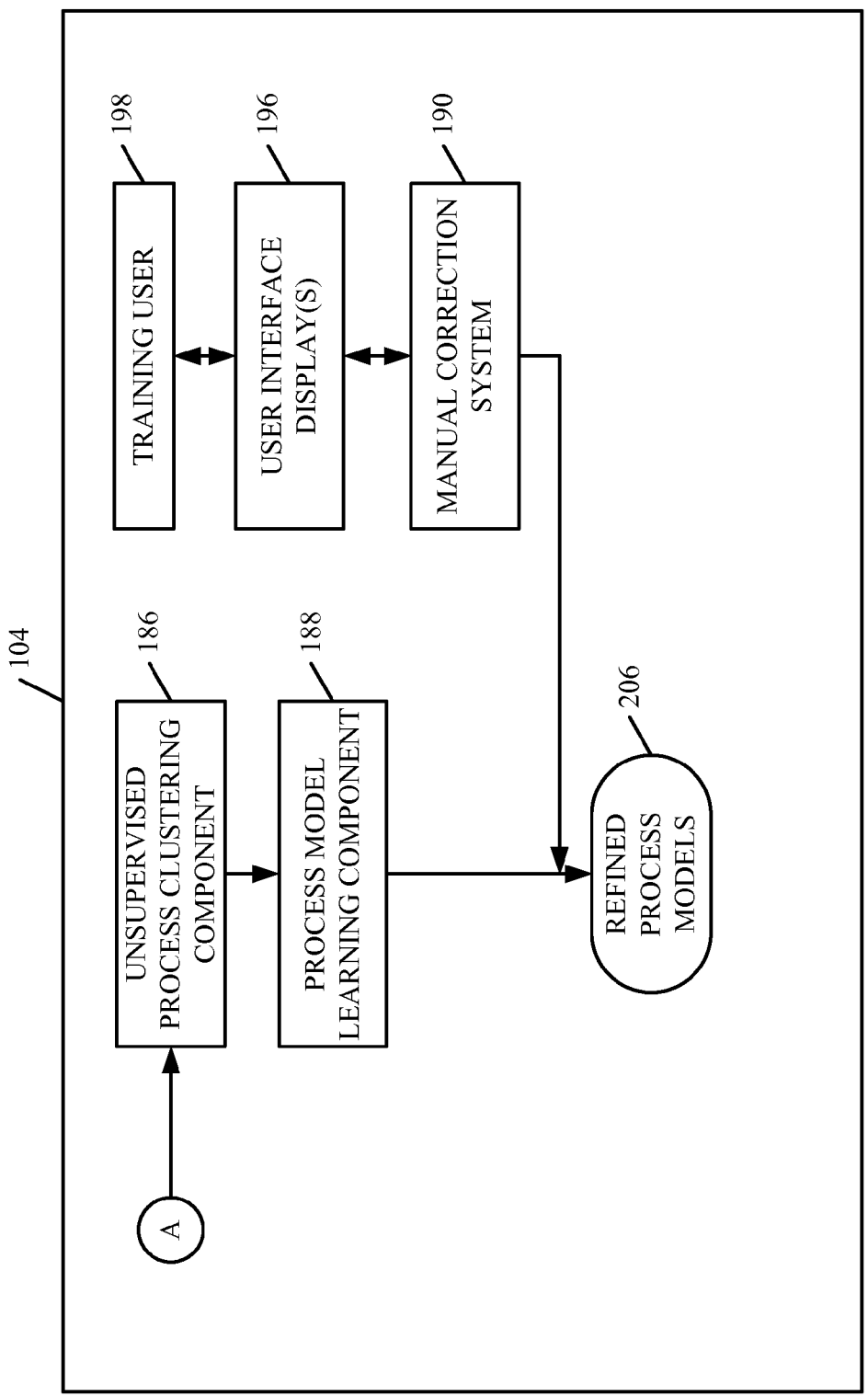

FIGS. 2A and 2B (collectively referred to herein as FIG. 2) show a more detailed block diagram of unstructured activity training system 104. System 104 is illustratively used to train a set of models that can be used by runtime system 108 to identify the type of unstructured activity detected, to associate detected activities with case identifiers, and to also associate them with processes, entities, etc., within computing system 102.

System 104 illustratively includes processors or servers 170, user interface component 172, unsupervised event clustering component 174, manual correction system 176, unsupervised case identifier (case ID) conflation component 178, event type identifier model learning component 180, process log data store 182, case ID conflation model learning component 184, unsupervised process clustering component 186, process model learning component 188, manual correction system 190, and it can include other items 192. FIG. 2 also shows that manual correction system 176 illustratively generates user interface displays 192 that can be interacted with by training user 194. Manual correction system 190 illustratively generates user interface displays 196 that can be interacted with by training user 198. It will be appreciated that systems 176 and 190 can be the same or different systems. Similarly, training users 194 and 198 can be the same or different training users.

Figure 3A:
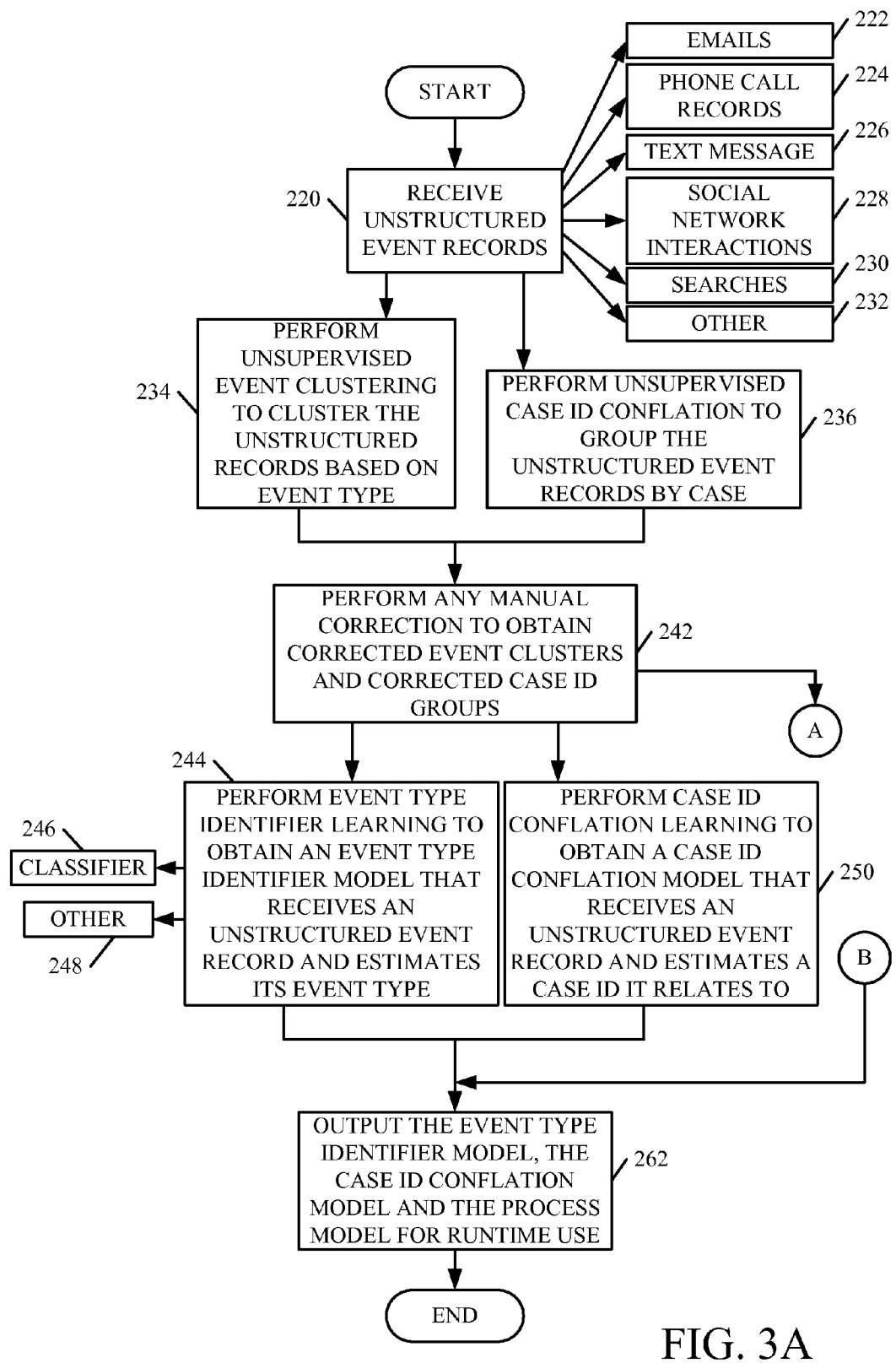
FIGS. 3A and 3B (collectively referred to herein as FIG. 3) show a flow diagram illustrating one example of the system shown in FIG. 2.
Figure 3B:
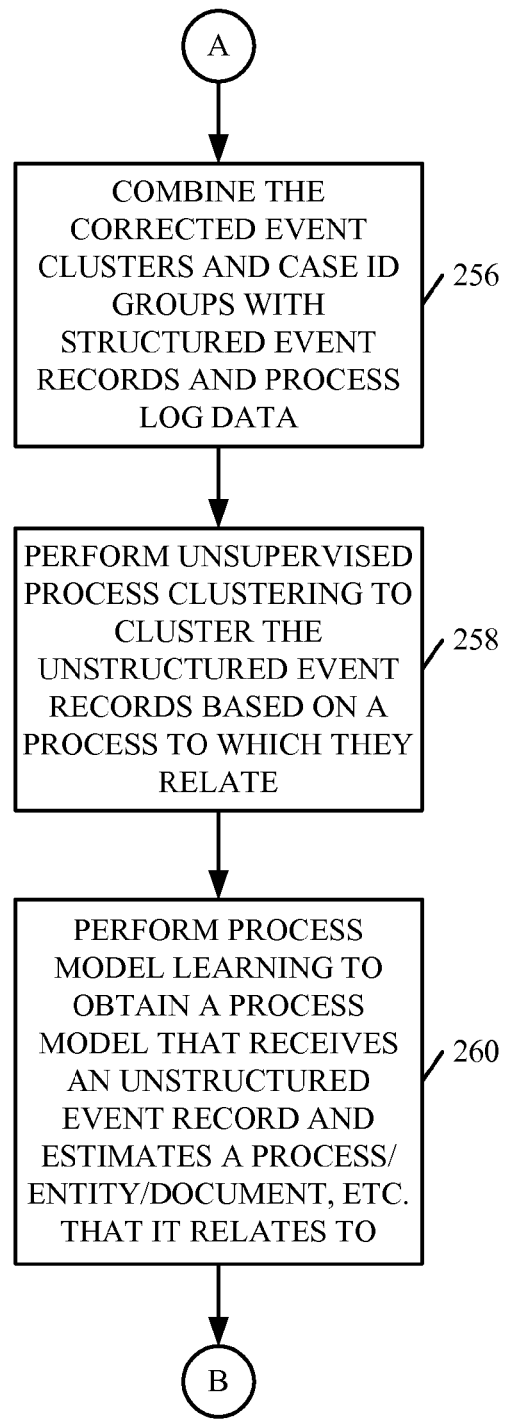

FIG. 2 also shows that system 104 illustratively has access to a set of unstructured event records 200. Records 200 are illustratively records that represent unstructured events, such as electronic mail messages, telephone calls or cellular phone calls, text messages, information retrieval searches, etc. System 104 illustratively receives records 200 and generates event type identifier model 202, case ID conflation model 204, and refined process models 206. FIGS. 3A and 3B (collectively referred to herein as FIG. 3) show a flow diagram illustrating one example of the operation of system 104 in doing this. FIGS. 2 and 3 will now be described in conjunction with one another.

System 104 first receives the unstructured event records 200. This is indicated by block 220 in FIG. 3. As briefly mentioned above, the records 200 can represent emails 222, phone call records 224, text messages 226, social network interactions 228, searches 230, or a wide variety of other unstructured activity 232. In one example, records 200 are training data records that are already manually labeled with an event type, case ID and a corresponding process identifier.

Records 200 are illustratively provided to unsupervised event clustering component 174 and unsupervised case ID conflation component 178. Component 174 illustratively performs unsupervised event clustering to cluster the unstructured event records 200 based upon a type of event that they represent. This is indicated by block 234. Such unstructured events are normally not stamped or otherwise identified with any type of canonical event type. However, because they represent training data, they may be manually labeled. By way of example, an email may be of a type that describes is function, such as "discussing options", "scheduling meeting", "nurturing customer", etc. Unsupervised event clustering component 174 illustratively performs unsupervised processing on records 200 to cluster them based on an estimation of the type of event that they represent. The event types may be known ahead of time, or unknown in which case the records 200 are clustered based on a set of similarity criteria.

Unsupervised case ID conflation component 178 also performs unsupervised processing on records 200 to group them into groups of records 200 that correspond to a same case identifier. That is, structured events are often automatically stamped with a case identifier (or case ID) by the system that generates them, or in which they are detected. Such events may be "alerting", "mitigating", etc. Every event relating to the same case shares the same case ID. However, communications regarding cases (such as email exchanges), or other unstructured activity, are often not stamped with the corresponding case ID. Unsupervised case ID conflation component 178 thus groups records 200 based on an estimate of which of those records belong to the same case. Performing unsupervised case ID conflation processing to group the unstructured event records by case is indicated by block 236 in FIG. 3.

The output of components 174 and 178 is based on unsupervised training. Therefore, in one example, training user 194 uses manual correction system 176 to perform any desired manual correction to the outputs of components 174 and 178. This results in corrected event clusters 238 and corrected case ID groups 240. Performing this type of manual correction is indicated by block 242 in FIG. 3.

Event type identifier model learning component 180 then performs event type identifier learning in order to obtain the event type identifier model 202. Once generated, model 202 can be used to receive an unstructured event record and estimate its event type. It will be noted that component 180 can perform a machine learning process or another type of automated learning process in order to generate event type identifier model 202. By way of example, model 202 may be a classifier that receives an input record and classifies it into one of a plurality of pre-defined event types. It can also be a rules-based model, a neural network, or a wide variety of other models. Performing this type of learning is indicated by block 244. Generating the model as a classifier is indicated by block 246, and generating the model as another type of model is indicated by block 248.

Case ID conflation model learning component 184 also performs case ID conflation learning on the corrected case ID groups 240. It performs this type of learning in order to generate the case ID conflation model 204. Model 204 is configured to receive an unstructured event record and estimate a case ID that it belongs to. Performing this type of learning is indicated by block 250 in FIG. 3. Model 204 can, for instance, also be a classifier, a rules-based model, a neural network, or a wide variety of other types of models. Component 184 can perform learning using machine learning algorithms, or a wide variety of other learning processes.

Process log store 182 illustratively stores logged data that corresponds to a wide variety of different types of processes. In one example, each of the unstructured event records 200 relates to at least one of the processes. It will be noted, however, that store 182 can also store unstructured activity patterns, logged entities, documents, or a wide variety of other information. Store 182 illustratively stores the information that is operated on by a set of structured events. Structured event records 252 represent that set of structured events that operates on the information in log store 182.

System 104 illustratively combines the corrected event clusters 238, the corrected case ID groups 240, the structured event records 252, and the process log data in store 182. This is indicated by block 256 in the flow diagram of FIG. 3. Unsupervised process clustering component 186 then performs unsupervised process clustering to cluster the unstructured event records 200 based on a process that they are related to, given all of the information that is combined and provided to it. It can also cluster them into unstructured activity patterns. Performing this type of unsupervised clustering is indicated by block 258 in FIG. 3. The output of component 186 is illustratively a set of clusters that cluster the records 200 into groups that are estimated to correspond to a same process, activity patterns, entity, document, etc.

Process model learning component 188 then performs process model learning (such as using a machine learning algorithm, etc.) to obtain a process model. The process model is illustratively configured to receive an unstructured event record and estimate a process/entity/document, etc. that it relates to. It also illustratively estimates whether it belongs to an unstructured activity pattern. This is indicated by block 260 in FIG. 3. Manual correction system 190 illustratively allows training user 198 to correct the output of component 188 in order to obtain the refined process models 206.

When all of the processing is completed, system 104 illustratively outputs the event type identifier model 202, the case ID conflation model 204, and the refined process models 206. They are output so they can illustratively be used in runtime unstructured activity processing system 108 (shown in FIG. 1). Outputting the models for use in the runtime system is indicated by block 262 in FIG. 3.

Figure 4A:
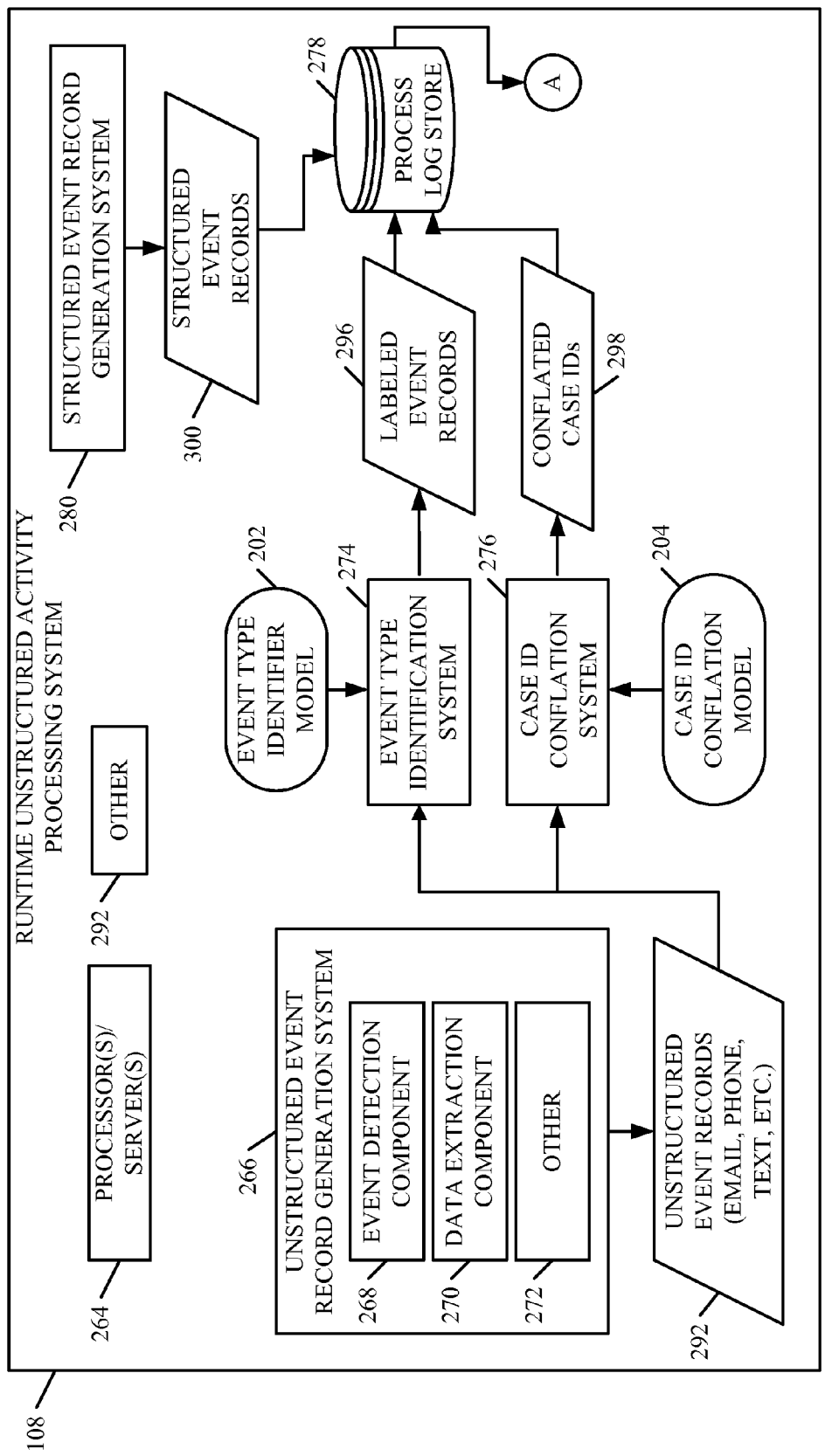
FIGS. 4A and 4B (collectively referred to as FIG. 4) show a more detailed block diagram of one example of a runtime unstructured activity processing system.
Figure 4B:
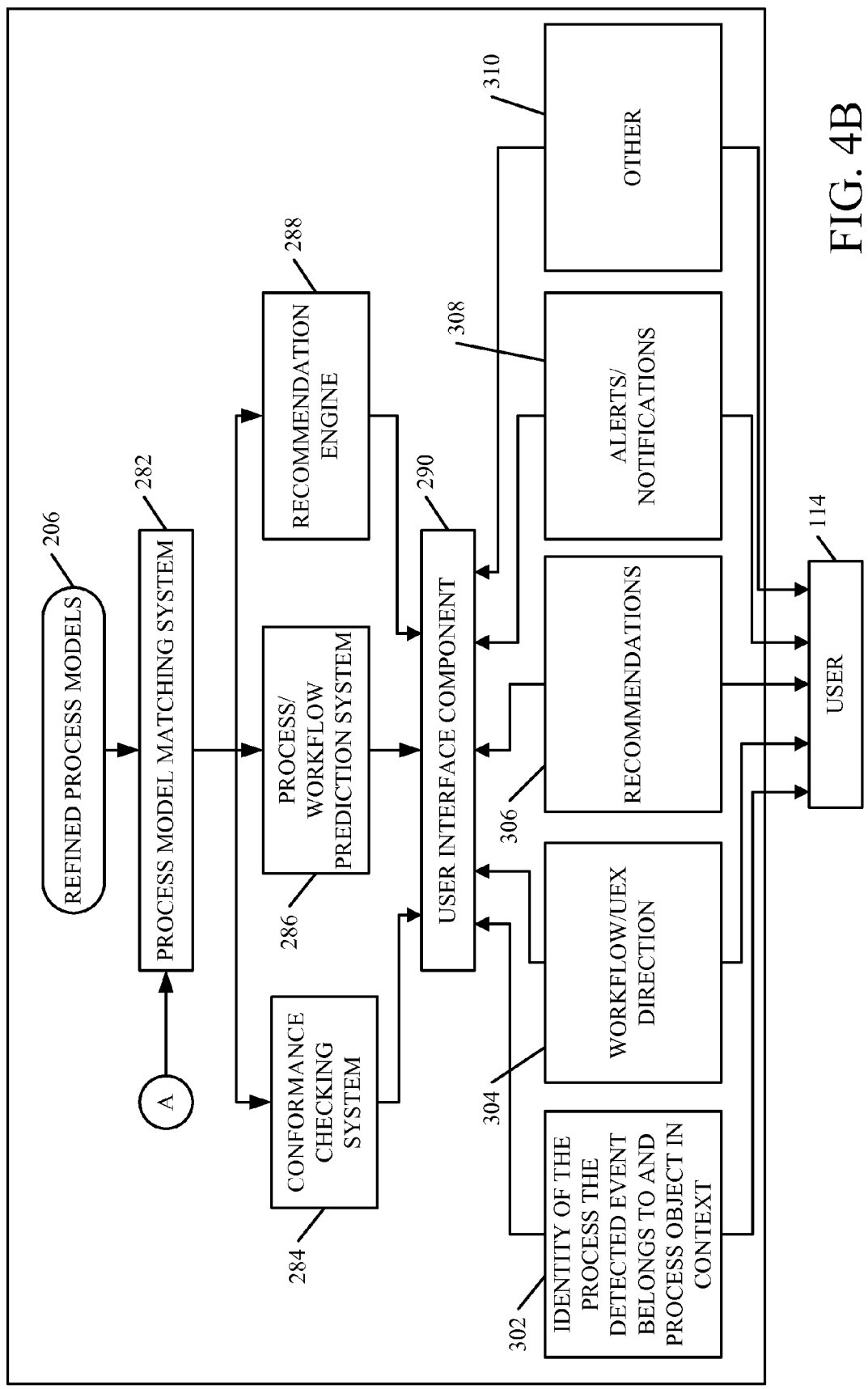

FIGS. 4A and 4B (collectively referred to as FIG. 4) show a more detailed block diagram of one example of the runtime unstructured activity processing system 108. In the example shown in FIG. 4, system 108 illustratively includes a set of processors or servers 264, unstructured event record generation system 266 (which, itself illustratively includes event detection component 268, data extraction component 270, and it can include other items 272), event type identification system 274, case ID conflation system 276, process log store 278, structured event record generation system 280, process model matching system 282, conformance checking system 284, process/workflow prediction system 286, recommendation system 288, user interface component 290, and it can include other items 292. FIG. 4 also shows that system 108 illustratively has access to event type identifier model 202, case ID conflation model 204, and refined process models 206.

By way of overview, system 226 detects unstructured activity and generates runtime unstructured event records 292 for them. Systems 274 and 276 use models 202 and 204, respectively, to label the event records with event types, as indicated by block 296 and with case IDs, as indicated by block 298. System 280 generates structured event records 300 that identify structured events taken within computing system 102, and process log store 278 includes log data that represents processes within runtime system 102. Process model matching system 282 uses refined process models 206 to match the labeled event records 296 (that also contain case IDs) with processes from process log store 278. Conformance checking system 282 can check to see whether those unstructured activities conform to pre-defined activity patterns. Process/workflow system 286 can initiate or direct a workflow or user experience. Recommendation engine 288 can recommend activities based on deviations from previously-detected patterns (or anomalies with respect to those patterns) and based on a wide variety of other things. It can also generate alerts or notifications.

Based on this information, user interface component 290 can generate an output indicating the identity of the process that the detected event belongs to, and can also display a process object in context. This is indicated by block 302. It can generate an output that guides or directs a workflow or user experience as indicated by block 304. It can output the recommendations 306. It can also output alerts or notifications 308, or it can generate a wide variety of other user interface outputs 310.

Figure 5:
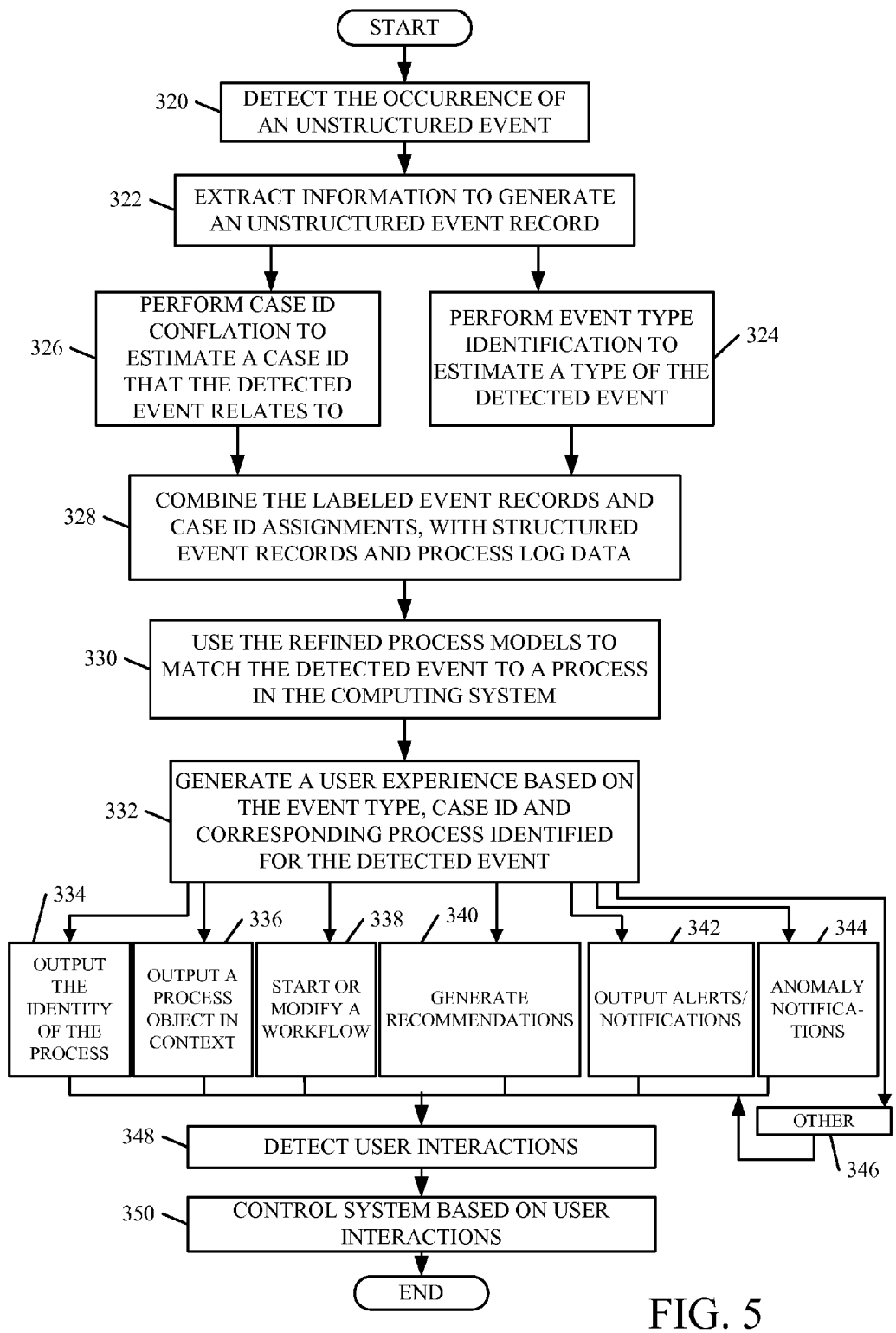
FIG. 5 is a flow diagram illustrating one example of the operation of the system shown in FIG. 4.

FIG. 5 is a flow diagram illustrating one example of the operation of system 108 in more detail. FIGS. 4 and 5 will now be described in conjunction with one another. Event detection component 268 first detect the occurrence of an unstructured event within computing system 102. This is indicated by block 320 in FIG. 5. As discussed above with respect to the training system, the unstructured events can take a wide variety of different forms, such as emails, phone calls, text messages, social network interactions, searches, etc.

Data extraction component 270 then extracts information indicative of the detected event. This is indicated by block 323 in FIG. 5. For instance, data extraction component 270 can extract information into a schema or data structure in order to form the unstructured event records 292. The schema or data structure may differ based upon the application through which the event is detected, the context of the application, the context of the computing system, or for a wide variety of other reasons. In any case, the information indicative of the detected event is extracted.

A few examples may be helpful. When the event is an electronic mail message, for instance, the detected information may include the author, recipients, time of day, content, subject matter line, or a wide variety of other information. In addition, data extraction component 270 can have additional processing components that can be used to obtain additional information. For instance, it can have speech-to-text components that receive a recorded cell phone call, and reduce it to text. It can also illustratively have natural language processing components that identify the meaning or semantic content of any textual items. For instance, such components illustratively identify the meaning of textual content in email messages, in attachments to emails, in a transcription of a telephone call, in messages, in the content of search results returned in response to a search, the textual content within a meeting notice (such as the subject matter content of a meeting, any documents attached to a meeting request, etc.) or a wide variety of other items. They can also have other semantic processing or sensor functionality to sense other items, such as the location of the user when the event was detected, what particular machine (e.g., mobile device, desktop computer, etc.) the user was logged into when the event was detected, or a wide variety of other information.

Event type identification system 274 then uses event type identifier model 202 to perform event type identification on the unstructured event record 292. This illustratively estimates a type of the detected event. The type can be selected from a pre-determined set of events, by model 202, or it can be an unidentified event, or a newly identified event. All of these identifications are contemplated herein. In addition, where model 202 is a classifier, then system 274 uses the model to classify the event into a certain type. Where it is a rules-based model, then it applies the rules in model 202 to identify an event type. Suffice it to say that system 274 uses whatever event type identifier model 202 is provided in order to identify an event type for the detected event, based upon the information in the unstructured event record 292. It can also access a plurality of different event type identifier models and voting logic to perform event type identification. Performing event type identification to estimate an event type is indicated by block 324 in FIG. 5.

Case ID conflation system 276 uses case ID conflation model 204 in order to estimate a case identifier to which the detected event relates. This is indicated by block 326. Again, model 204 may be a wide variety of different types of models, and system 276 uses model 204 to process record 292 and estimate a case identifier that corresponds to that record.

The labeled event record 296 that is labeled with the event type and the conflated case ID 298 that identifies a particular case identifier for the record are both provided to process log store 278, along with structured event records 300. Combining the labeled event records and case ID assignments with the structured event records and process log data is indicated by block 328.

Again, with respect to the scenario of a sales process where a potential customer comes to a company website and fills out a form, a lead gets created in the structured process. This is a structured event. The lead will thus be assigned a case identifier that identifies the case number assigned to that particular lead. Event type identifier 274 will illustratively use event type identifier model 202 to identify that the event type corresponding to the email sent by the user to the potential customer as a "customer sales inquiry email" event type. Case ID conflation system 276 will illustratively use case ID conflation model 204 to identify the case ID that was assigned to the lead that was first created when the potential customer filled out a form on a website and submitted it.

Process model matching system 282 then uses refined process models 206 in order to match the detected event (represented by record 292, which now includes an event label and case ID) to a process in computing system 102. This is indicated by block 330. As discussed above, model 206 receives the record 292 and estimates a particular process within computing system 102, that the record is related to. By way of example, if the unstructured event is the email that was sent by the sales representative to the potential customer, then matching system 282 will illustratively use refined process model 206 to identify that the particular email event corresponds to the sales process in the ERP system. It can also identify whether it is part of an activity pattern for the user (e.g., the sales representative). Process model matching system 282 then provides the unstructured event record 292, along with its event label and case ID, and along with an indication of the particular process that it belongs to, to conformance checking system 284, process/workflow prediction system 286 and recommendation engine 288. It can provide it to other items as well. These items illustratively control user interface component 290 to generate a user experience based on the event type, case ID and corresponding process (or activity pattern or both) identified for the detected event. This is indicated by block 332 in FIG. 5.

For instance, these systems can control user interface component 290 to output the identity of the particular process that the detected event corresponds to. This is indicated by block 334. Process/workflow prediction system 286 can output a process object, in proper context, given the detected event. This is indicated by block 336. By way of example, if a customer provides a social network communication that indicates a negative feedback with respect to a product of a company, then process/workflow prediction system 286 can open a customer response form that allows a user of the organization to schedule a telephone call or a conference or another meeting with the customer to discuss the negative feedback. Of course, this is only one example. System 286 can also illustratively start or modify a given workflow for a user. This is indicated by block 338. Recommendation engine 288 can generate recommendations as well. This is indicated by block 340. For instance, if system 286 starts a workflow by which the user is to respond to a customer that provided negative feedback, by sending the customer an email, then recommendation system 288 may recommend recipients or attachments for the email. In addition, recommendation engine 286 may recommend further steps (whether structured or unstructured) that the user can take given the particular unstructured event that was just detected. By way of example, if the unstructured event is to detect negative comments on a social network site about a product, then recommendation engine 288 can recommend that the user responding to that customer not only email, but also call, and include a customer service engineer on the call. Of course, all of these are examples only.

Any of the systems can also output alerts or notifications based on the detected event. This is indicated by block 342.

Similarly, conformance checking system 284 may identify that the user has deviated from the user's normal unstructured activity pattern under certain circumstances. For instance, it may be that a user always responds to an email from a certain sender, but has not yet done so. It may also be that the user consistently performs a series of steps, in order, but the user has skipped one of those steps. Conformance checking system 284 can identify this and provide an anomaly notification 344 to the user indicating this.

It will also be noted that the systems 284-288 can operate in conjunction with one another and provide combinations of outputs. For instance, they may provide an alert indicating that an unstructured event has been detected, that is going to affect a critical date (such a ship date of a product, etc.), along with a recommendation as to what to do in response to that detected event. By way of example, it may be that a key employee has called in sick and therefore a task assigned to that key employee may be late. It may also be that the key employee did not perform his or her assigned tasks. In that case, system 286 can generate an alert that a particular task or project is going to miss a deadline. Conformance checking system 284 can output a notification indicating that they key employee did not perform certain steps that are part of a detected activity pattern for that key employee, and recommendation engine 288 may recommend that the task be reassigned to another employee, because the key employee has called in sick. All of these and a wide variety of different combinations are contemplated herein.

The systems can output other user experiences in other ways as well. This indicated by block 346.

The outputs by any of systems 284-288, or other systems, can include user input mechanisms that can be actuated by the user in order to perform certain actions. For instance, a recommendation may be to take a certain action (such as send an email) and include a user input mechanism that can be actuated by the user in order to initiate the action (such as draft and send the email). Detecting user interactions is indicated by block 348. Computing system 102 then controls any of the other systems based on those user interactions, in order to perform the desired actions. This is indicated by block 350.

Some of the outputs may indicate that an anomaly has occurred in the user's unstructured activity, and also it may include a suggestion as to how to address the anomaly. For instance, if a user always returns calls from ACME Corporation, and always responds to emails from them, the user may inadvertently fail to do this. Thus, the conformance checker will identify that this anomaly has occurred, and the recommendation engine can generate an appropriate recommendation. For instance, the recommendation may be a user interface display, alert, notification, etc. It can read, for instance "you didn't call back ACME Corp." Or "you haven't responded to an email from ACME Corp." It may also make other recommendations such as "you said you would send a document to ACME Corp., and you haven't done so yet." Further, the recommendation may be simple such as "you usually reply."

It can thus be seen that the present system automatically captures unstructured activity. It can automatically detect patterns in the unstructured activity and identify that the activity or pattern of activity relates to a process within the computing system (e.g., a business process). It can identify anomalies in patterns of unstructured activity and trigger a workflow or modify a user experience to respond to those anomalies. All of this significantly enhances the operation of the computing system. By detecting these external events, and capturing them in the computing system, the computing system can operate more efficiently. The efficiency of the users is also improved. For instance, users need not separately query the system for unstructured activity (such as by searching email, searching text messages, searching through document stores, or call records, etc.). Instead, the system automatically detects this and surfaces it in a structured way, in the proper context. This reduces network activity in searching the system, and it also reduces rendering overhead for rendering the interfaces necessary to perform all of the different types of manual searches. Instead, the system automatically and advantageously detects and logs the information, and then identifies it, assigns a case identifier, generates recommendations, etc. Thus, the operation of the system is enhanced in this way as well.

FIGS. 6A-6D show some examples of user interface displays that can be generated for a user by the runtime unstructured activity processing system 108. It will be noted, of course, that these are examples only.

Figure 6A:
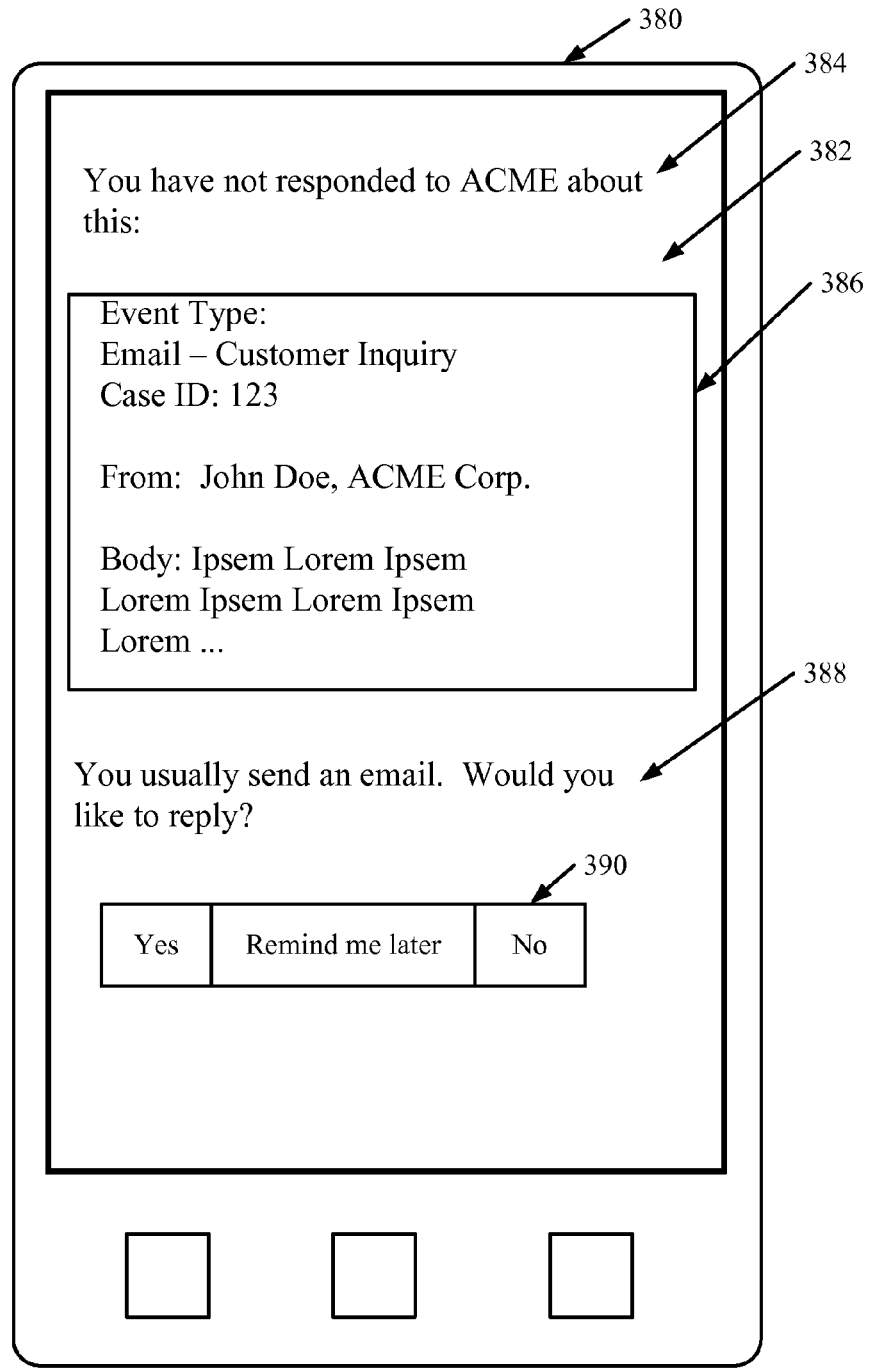
FIGS. 6A-6D show examples of user interface displays.

FIG. 6A shows one example of a mobile device 380 that has generated a user interface display 382. It is assumed that system 108 has detected receipt of an electronic mail message from an individual, John Doe, at ACME Corp. It has also detected that, according to the process models, the present user of mobile device 380 normally responds to electronic mail messages from John Doe at ACME Corp. It has also detected that the user has not yet done so. This can be done by conformance checking system 284 identifying an anomaly in the user's normal pattern of activity in response to emails. Therefore, it can bring this to the user's attention, and recommendation engine 288 can also make a recommendation. It can be seen in user interface display 382 that a textual message is described at 384. The textual message states "you have not responded to ACME about this."

The display also includes a subject matter display area 386 that displays the subject matter of this particular notice or recommendation. It can be seen that the electronic mail message received from John Doe of ACME Corporation has been correctly identified with an event type of "email-customer inquiry". It also has been identified with a correct case identifier (case ID: 123). The textual content of the electronic mail message is also displayed. Recommendation section 388 also displays a recommendation such as "you usually send an email. Would you like to reply?". It also displays a set of user input mechanisms 390 that allow the user to easily initiate an electronic mail message reply to the message displayed at 386.

Figure 6B:
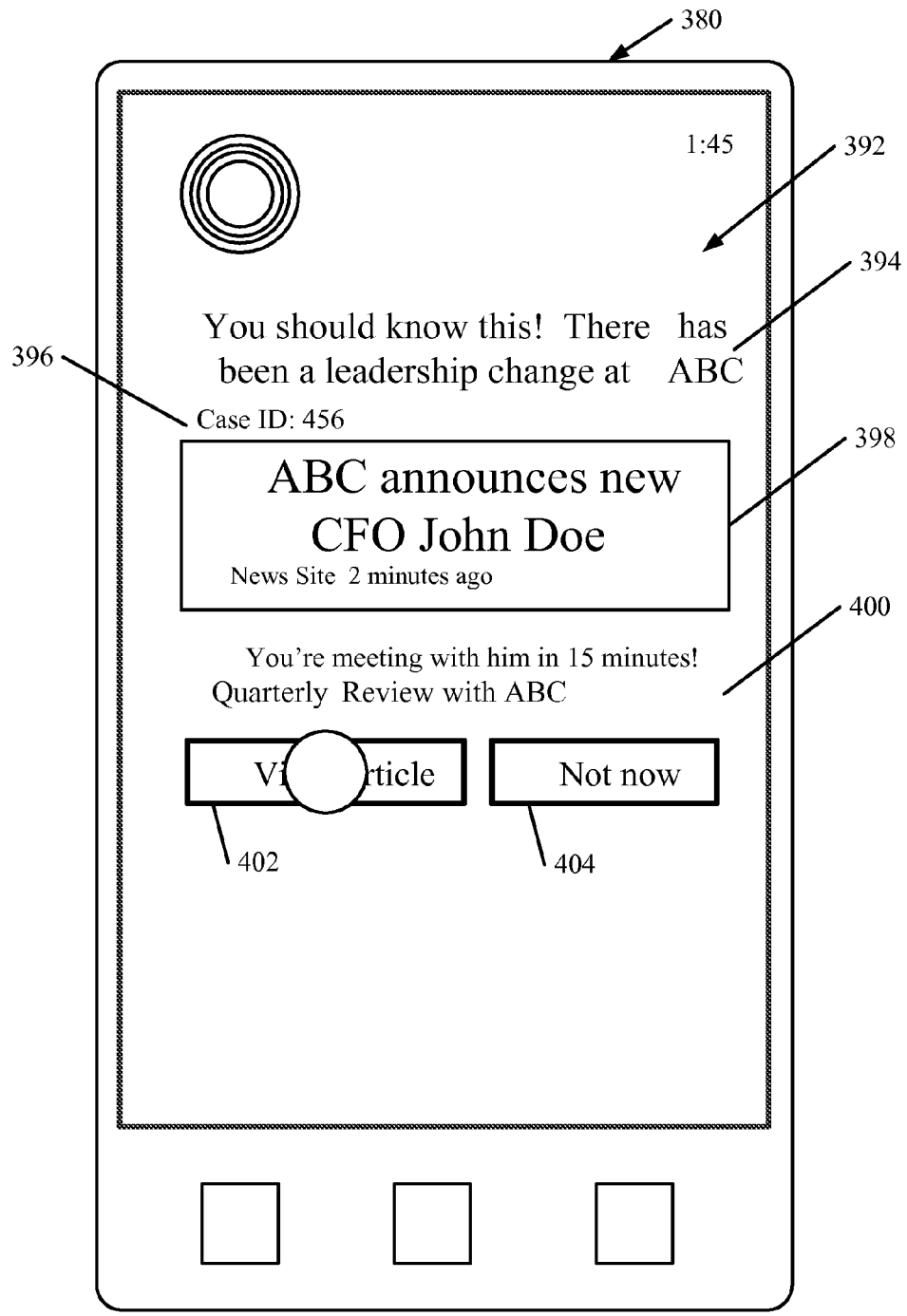
Figure 6C:
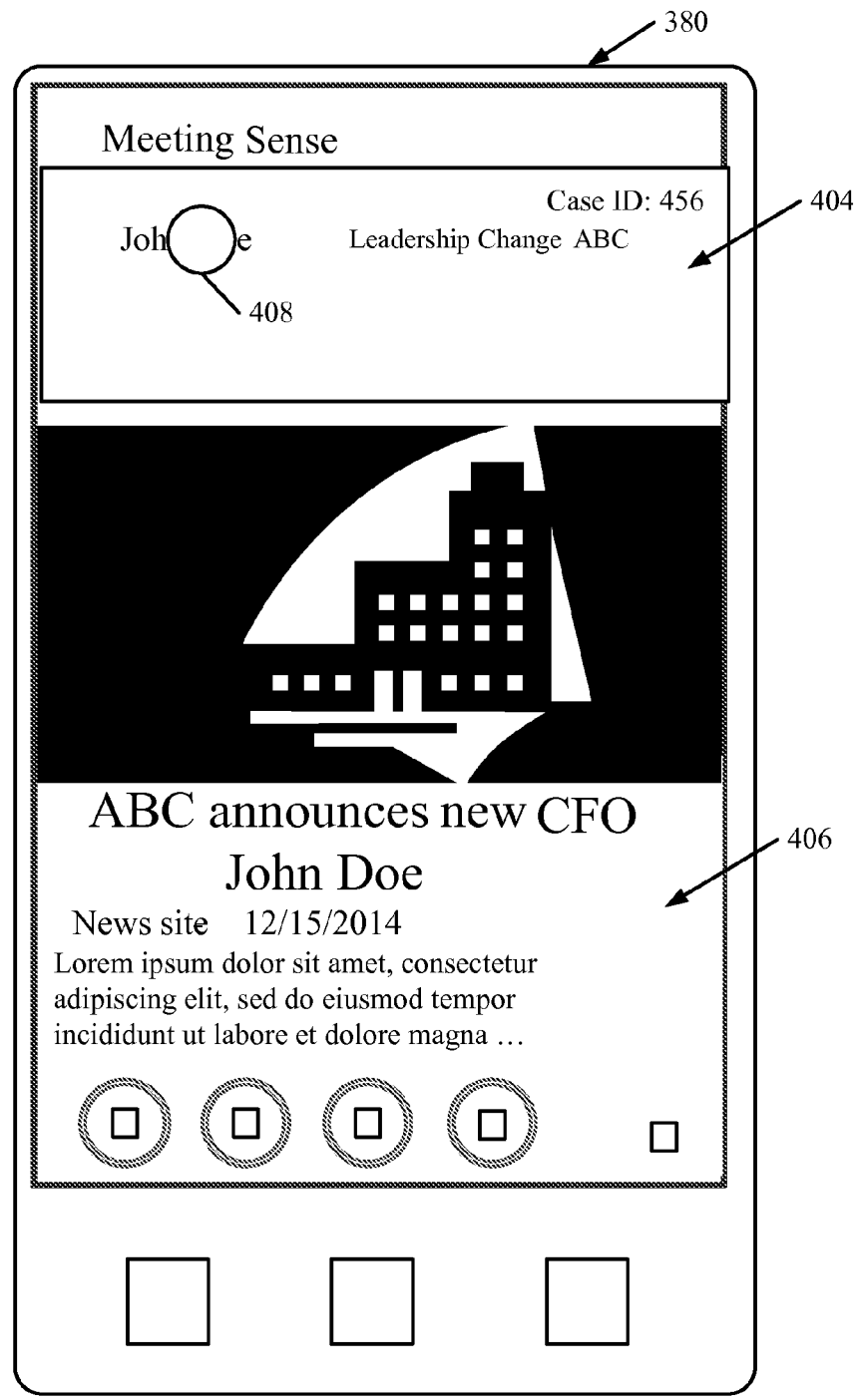
Figure 6D:
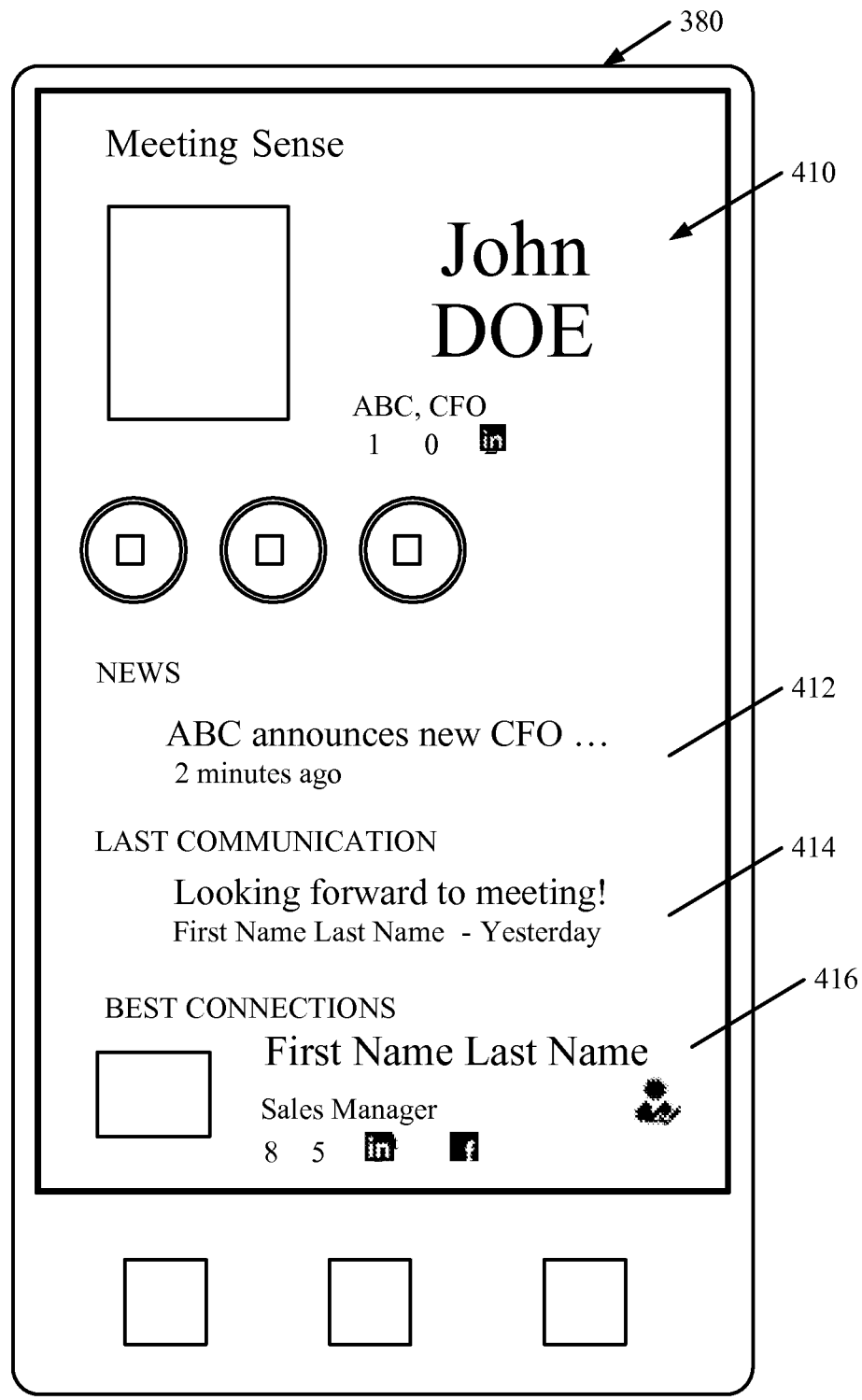

FIGS. 6B-6D show another example in which the unstructured activity that has been detected is detected by search engine 125 searching the website of another organization, such as a news site, and identifying a news story stating that there has been a leadership change announcement at a customer organization. System 108 has identified the event type as "leadership change". It is also assumed for the sake of the discussion of FIGS. 6B-6D that the present user of mobile device 380 also has a meeting scheduled with the subject person (John Doe) in the next 15 minutes for a quarterly review. In one example, unstructured event record generation system 266 detects this event, and it is classified as a "leadership change" event type by system 274 and model 202. System 276 and model 204 identify the case ID for this event type, and it is the same case ID that is assigned to the scheduled meeting.

It is thus surfaced for the user, in the context of the meeting, such as is shown in FIG. 6B. It can be seen that the user interface display 392 illustratively includes a descriptive section 394 that indicates that the user should know of the breaking news (e.g., the leadership change). It also has a case ID portion 396 that identifies the case identifier for this event type, and it displays a display element 398 that corresponds to the announcement that was detected. It also includes a descriptive portion 400 that identifies why this is relevant to the particular user, and it includes a set of user input mechanisms 402 and 404 that allow the user to either learn more about the detected event, or not.

FIG. 6C shows another example of a display 404 on mobile device 380. User interface display 404 is generated when the user actuates the "view article" user input mechanism 402 in FIG. 6B. Display 404 shows that the user's contact "John Doe" is involved in a "leadership change" event at the user's contact organization "ABC". It also shows that the leadership change event is related to the case ID "456".

The content of the article is displayed generally at 406. When the user actuates the name of the contact "John Doe" (as illustrated by circle 408), the user is navigated to an information page shown generally in FIG. 6D. The information change can include the identity of the contact at 410, the news item related to the contact at 412, the last communication with the user at 414, and a list of connections that the user has at 416. Thus, the unstructured activity (the news announcement) is captured, it is given an event type (leadership change), it is given a case ID, and it is tied to a meeting object on the particular user's calendar (the user has a meeting with John Doe in 15 minutes). It thus notifies the user of the leadership change event, and it notifies the user within a context that is useful to the user (e.g., in the context of the user's meeting with the subject person).

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
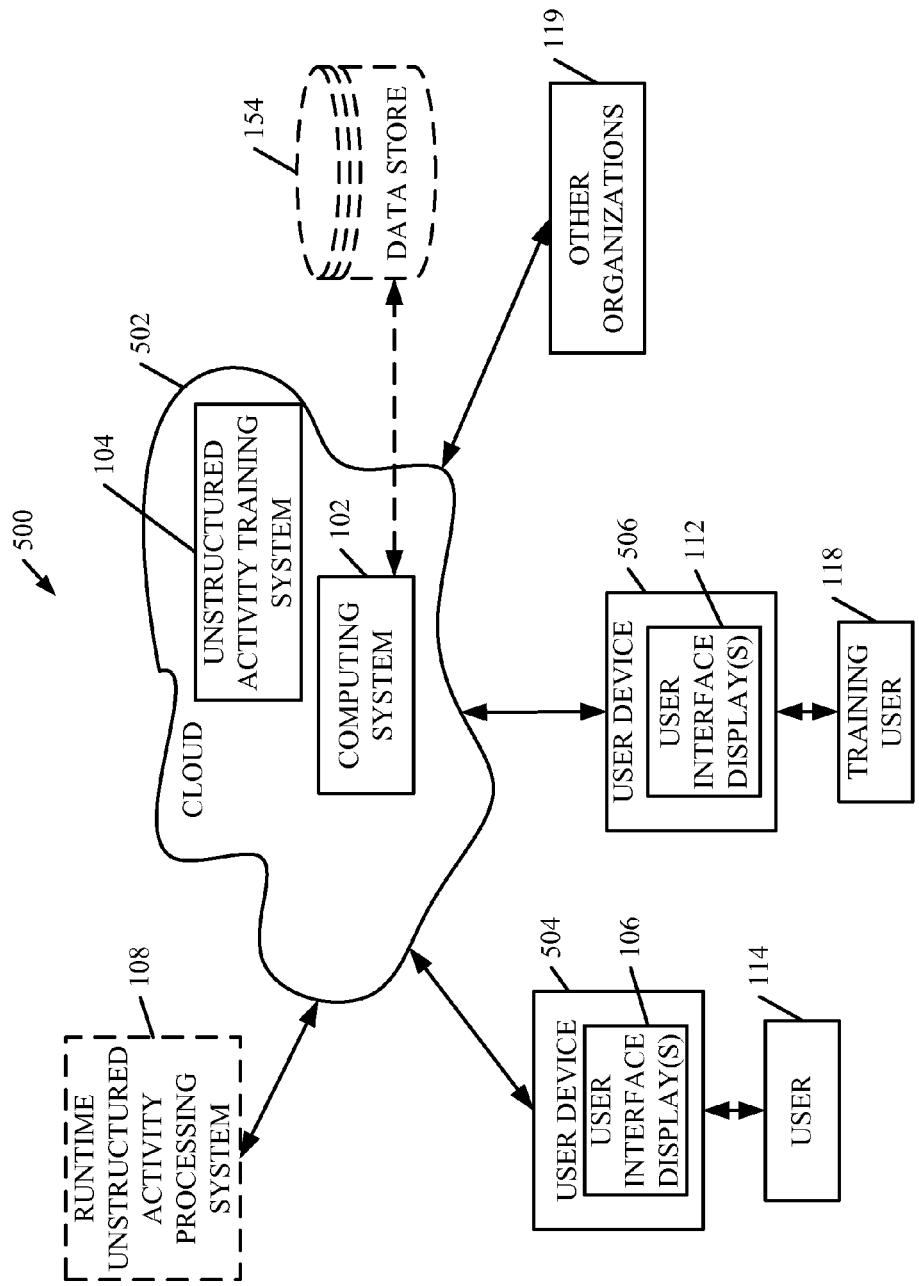
FIG. 7 shows one example of the architecture illustrated in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that computing system 102 and training system 104 are located in cloud 502 (which can be public, private, or a combination where portions are public while others are private). Therefore, users 114 and 118 use user devices 504 and 506 to access those systems through cloud 502.

FIG. 7 also depicts another example of a cloud architecture. FIG. 7 shows that it is also contemplated that some elements of systems 102 and 104 can be disposed in cloud 502 while others are not. By way of example, data store 154 can be disposed outside of cloud 502, and accessed through cloud 502. In another example, system 108 can also be outside of cloud 502. Regardless of where they are located, they can be accessed directly by devices 504 and 506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
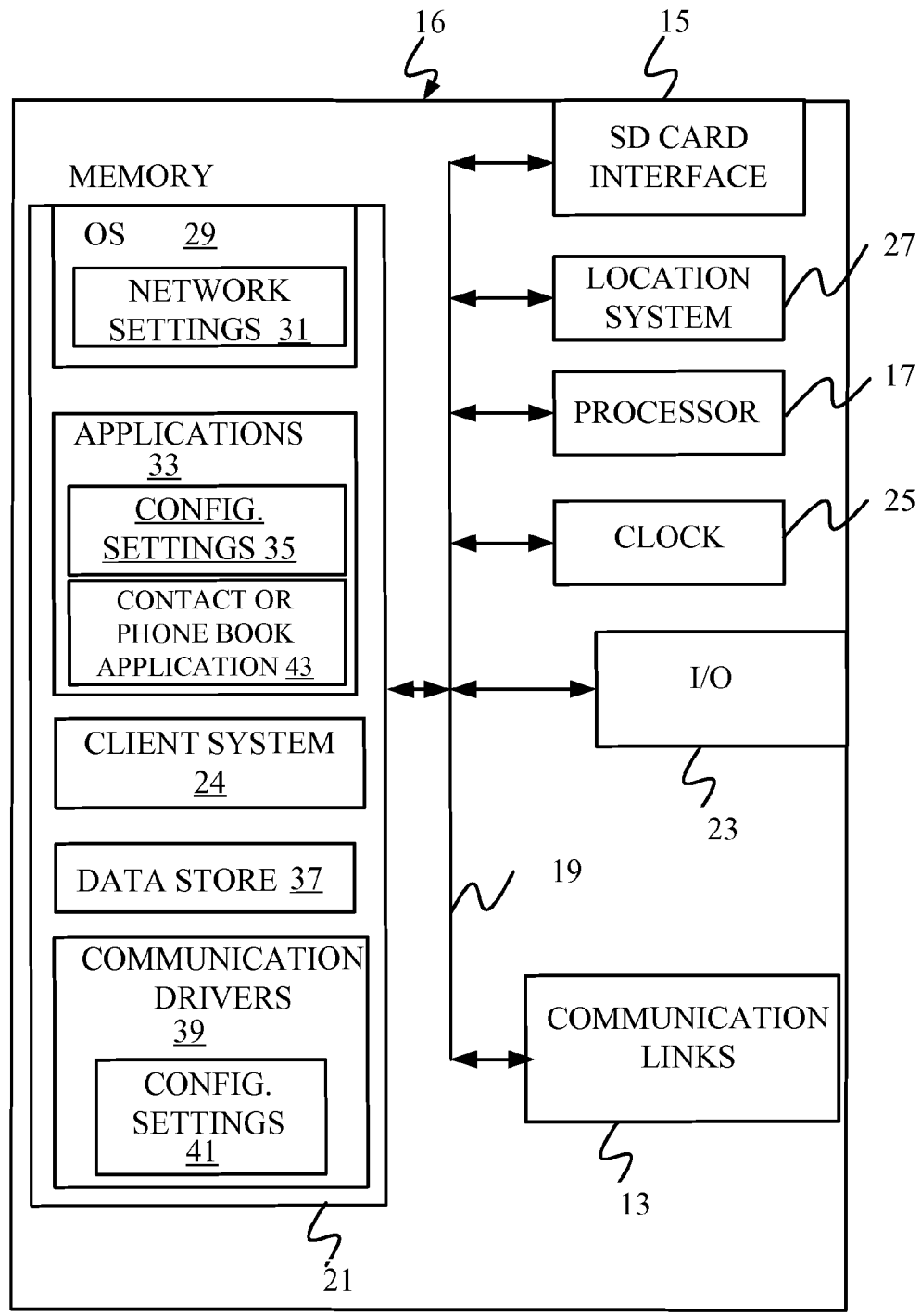
FIGS. 8-10 show various examples of mobile devices that can be used in the architecture shown in the previous figures.
Figure 9:
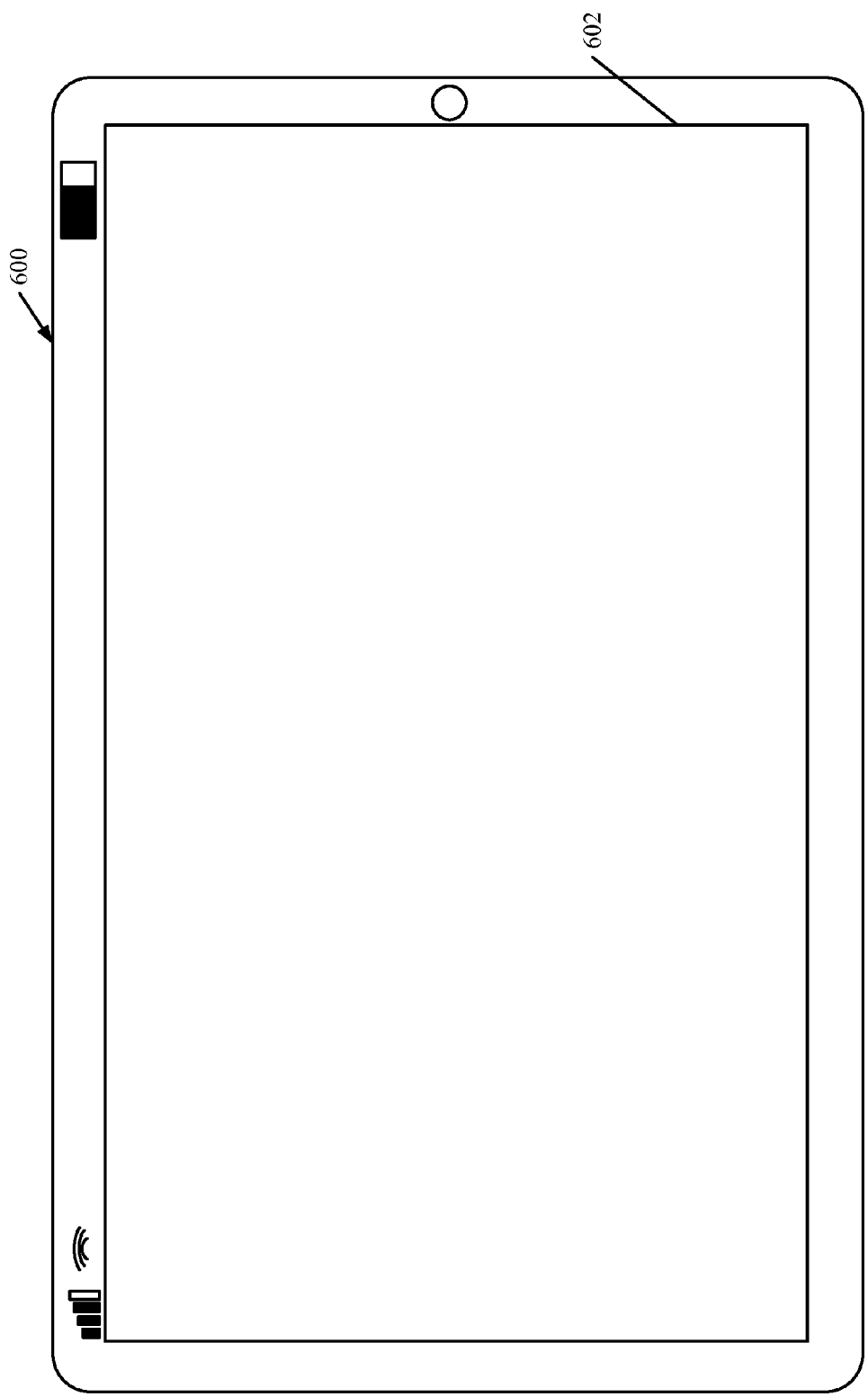
Figure 10:
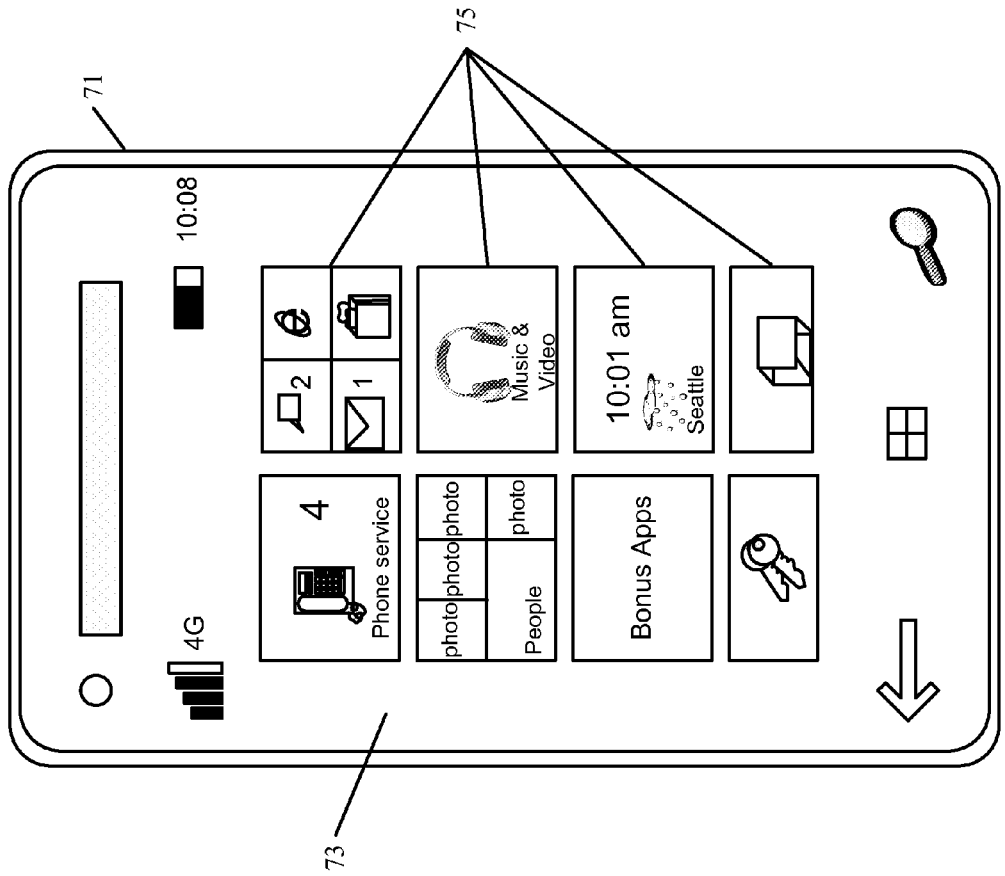

FIG. 8 is a simplified block diagram of one illustrative example of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of computing system 102 or system 104 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 126, 170 or 264 from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a business system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can also be used. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone includes an antenna for receiving cellular phone signals such as General Packet Radio Service (GPRS) and 1xrtt, and Short Message Service (SMS) signals. In some examples, the phone also includes a Secure Digital (SD) card slot that accepts a SD card.

The mobile device can also be a personal digital assistant or a multimedia player or a tablet computing device, etc. (hereinafter referred to as PDA). The PDA includes an inductive screen that senses the position of a stylus (or other pointers, such as a user's finger) when the stylus is positioned over the screen. This allows the user to select, highlight, and move items on the screen as well as draw and write. The PDA also includes a number of user input keys or buttons which allow the user to scroll through menu options or other display options which are displayed on the display, and allow the user to change applications or select user input functions, without contacting the display. Although not shown, the PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 10 shows that the phone can be smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
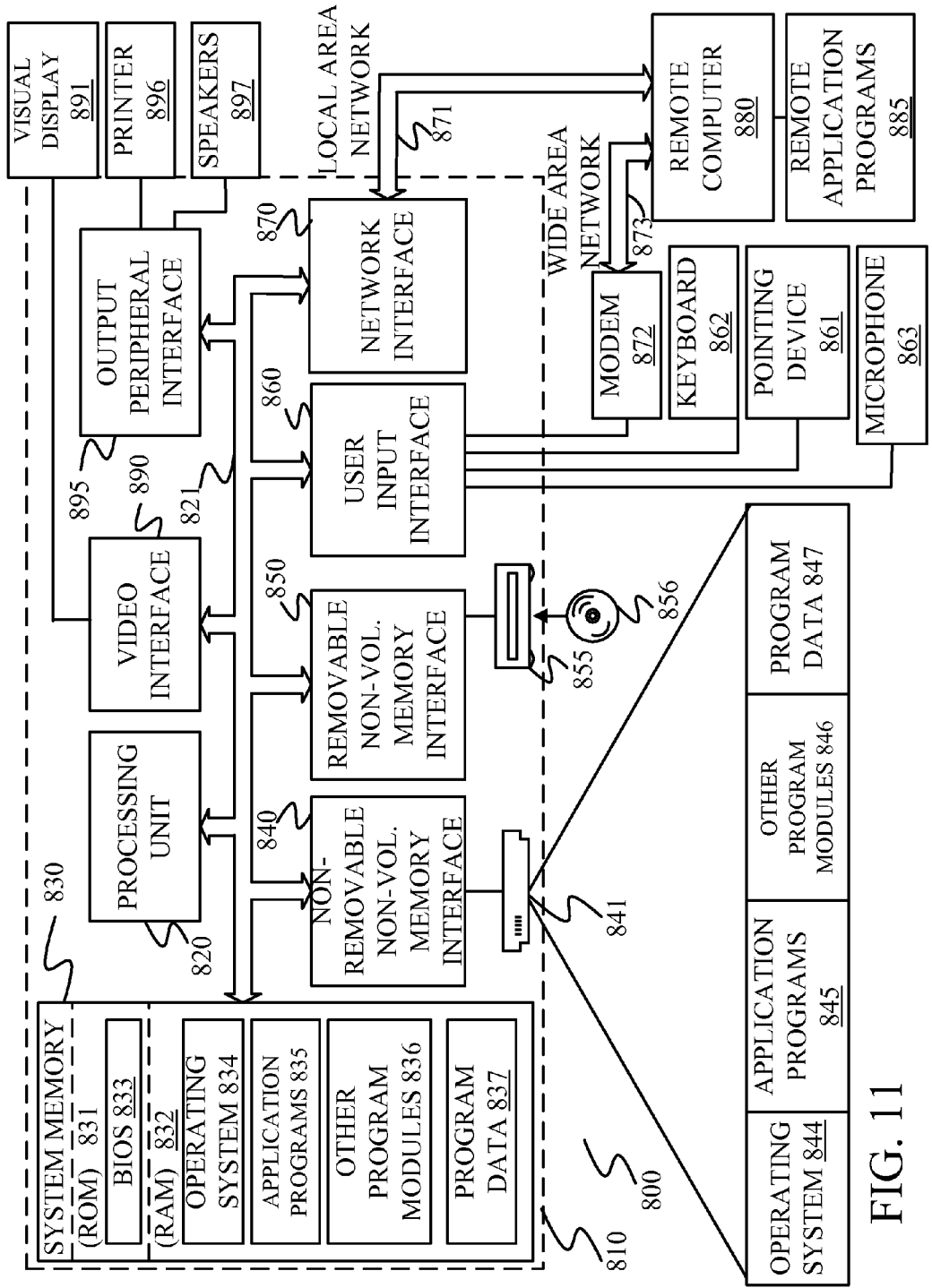
FIG. 11 is a block diagram of one example of a computing environment that can be used in the architectures shown in the previous figures.

FIG. 11 is one example of a computing environment in which architecture 100, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processor 126, 170 or 264), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

an event type identification system that receives an unstructured event record with event information indicative of an unstructured event, the event type identification system accessing an event type identifier model, identifying an event type corresponding to the unstructured event based on the event information and the event type identifier model, and generating an event type label, indicative of the event type, for the unstructured event record;

a process model matching system that accesses a process model and a set of logged computing system processes and identifies a process in the computing system that the unstructured event corresponds to, based on the unstructured event record;

a user interface component; and a workflow prediction system that predicts a workflow based on the identified process and the identified event type for the unstructured event record and controls the user interface component to surface the predicted workflow for user interaction.

Example 2 is the computing system of any or all previous examples wherein the process model matching system detects an unstructured activity pattern for a given user.

Example 3 is the computing system of any or all previous examples wherein the process model matching system detects whether the unstructured event is part of an activity pattern for a given user and wherein it identifies that the activity pattern relates to the identified process.

Example 4 is the computing system of any or all previous examples and further comprising:

a conformance checking system that compares the unstructured activity record against the activity pattern for the given user and identifies an anomaly in a the activity pattern for the given user, based on the unstructured activity record.

Example 5 is the computing system of any or all previous examples and further comprising:

a recommendation engine that generates a recommended action based on the anomaly.

Example 6 is the computing system of any or all previous examples wherein the recommendation engine controls the user interface component to surface a user interface display with a user input mechanism that is actuated to take the recommended action.

Example 7 is the computing system of any or all previous examples wherein the workflow prediction system identifies a computing system object corresponding to the unstructured event record and opens the computing system object in an application context based on the unstructured event record.

Example 8 is the computing system of any or all previous examples and further comprising:

a case identifier (ID) conflation system that accesses a case ID conflation model to associate the undetected event record with a case in the computing system.

Example 9 is the computing system of any or all previous examples and further comprising:

an event detection component that detects the unstructured event; and an information extraction component that extracts the event information and generates the unstructured event record.

Example 10 is the computing system of any or all previous examples wherein the event type identifier model comprises:

an event type classifier that classifies the unstructured event record into an event type.

Example 11 is a computing system that associates related, structured events with a case identifier, comprising:

a process model matching system that receives a labeled unstructured event record that includes event information indicative of an unstructured user interface event in the computing system, the unstructured event record being labeled with an event type, the process model latching system accessing a process model to identify an entity in a structured process that the unstructured event record corresponds to;

a user interface component; and a workflow prediction system that controls the user interface component to surface the entity based on the unstructured event record.

Example 12 is the computing system of any or all previous examples and further comprising:

an event type identification system that receives the unstructured event record and accesses an event identification model to identify an event type corresponding to the unstructured event record.

Example 13 is the computing system of any or all previous examples wherein the event identification model comprises a classifier.

Example 14 is the computing system of any or all previous examples and further comprising:

a case identifier (ID) conflation system that receives the unstructured event record and accesses a case ID conflation model and identifies a case ID within the computing system to which the unstructured event record corresponds.

Example 15 is the computing system of any or all previous examples wherein the process model matching system identifies an unstructured activity pattern and determines whether the unstructured event record is part of the unstructured activity pattern.

Example 16 is the computing system of any or all previous examples and further comprising:

a conformance checking system that determines whether the unstructured event record represents an anomaly in the unstructured activity pattern.

Example 17 is the computing system of any or all previous examples and further comprising:

a recommendation engine that controls the user interface component to surface a recommendation in response to the conformance checking system determining that the unstructured event record represents an anomaly.

Example 18 is a computer implemented method, comprising:

detecting an unstructured event in a computing system;

extracting information indicative of the unstructured event to generate an unstructured event record;

classifying the unstructured event record to identify a corresponding event type;

identifying a part of a structured workflow in the computing system that the unstructured event record corresponds to; and controlling a user interface component to surface the part of the structured workflow for user interaction.

Example 19 is the computer implemented method of any or all previous examples and further comprising:

identifying a set of activity patterns in the computing system corresponding to a given user; and determining whether the unstructured activity record represents an anomaly in a given activity pattern; and if so, controlling the user interface component to generate a recommendation to address the anomaly.

Example 20 is the computer implemented method of any or all previous examples and further comprising:

accessing a case identifier (ID) conflation model to assign the unstructured event record to a case ID within the computer system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions, when executed, configure the computing system to:
receive an unstructured event record with event information indicative of an unstructured event, the unstructured event comprising an event other than a structured event that has a predefined event type and is configured to occur according to a predefined workflow associated with the computing system;
access an event type identifier model;

identify an event type corresponding to the unstructured event based on the event information and the event type identifier model;
generate an event type label, indicative of the event type, corresponding to the unstructured event record;
access a process model and a set of logged computing system processes to identify a process;
based on the unstructured event record, determine that the unstructured event corresponds to the identified process;
identify a workflow based on the identified process and the identified event type corresponding to the unstructured event record;
identify an anomaly in an activity pattern based on the identified process;
modify the workflow based on the identified anomaly;
generate a representation of a user interface display that includes the modified workflow and a user input mechanism; and
based on an indication of user actuation of the user input mechanism, perform an action with respect to the modified workflow.

2. The computing system of claim 1 wherein the instructions configure the computing system to detect an unstructured activity pattern associated with a particular user.

3. The computing system of claim 2, wherein the instructions configure the computing system to detect whether the unstructured event is part of the activity pattern associated with the particular user and identity that the activity pattern relates to the identified process.

4. The computing system of claim 3, wherein the instructions configure the computing system to:
compare the unstructured activity record against the activity pattern for the particular user and identify the anomaly in the activity pattern for the user, based on the comparison.

5. The computing system of claim 1, wherein the instructions configure the computing system to:
generate a recommended action based on the anomaly.

6. The computing system of claim 5 wherein the instructions configure the computing system to:
generate a representation of an action user input mechanism; and
based on an indication of user actuation of the action user input mechanism, perform the recommended action.

7. The computing system of claim 1 wherein the instructions configure the computing system to:
identify a computing system object corresponding to the unstructured event record and open the computing system object in an application context based on the unstructured event record.

8. The computing system of claim 1, wherein the instructions configure the computing system to:
access a case identifier (ID) conflation model to associate the unstructured event record with a case in the computing system.

9. The computing system of claim 1 wherein the instructions configure the computing system to:
detect the unstructured event;
extract the event information; and
generate the unstructured event record.

10. The computing system of claim 1 wherein the instructions configure the computing system to:
classify the unstructured event record into an event type.

11. A computing system comprising:
a processor; and
memory storing instructions executable by the processor, wherein the instructions, when executed, configure the computing system to:
receive a labeled unstructured event record that includes event information indicative of an unstructured user interface event in the computing system, the unstructured event record being labeled with an event type, the unstructured user interface event comprising an event other than a structured event that has a predefined event type and is configured to occur according to a predefined workflow associated with the computing system;
access a process model and a set of logged computing system processes to identify a process;
based on the unstructured event record, determine that the unstructured event record corresponds to the identified process;
identify a workflow based on the process and the event type corresponding to the unstructured event record;
identify an anomaly in an activity pattern based on the identified process;
modify the workflow based on the identified anomaly; and
generate a representation of a user interface display that represents the modified workflow.

12. The computing system of claim 11, wherein the instructions configure the computing system to:
receive the unstructured event record and access an event identification model to identify an event type corresponding to the unstructured event record.

13. The computing system of claim 12 wherein the event identification model comprises a classifier.

14. The computing system of claim 12 and further comprising:
receive the unstructured event record;
access a case identifier (ID) conflation model; and
based on the accessed case ID conflation model, identify a case ID within the computing system to which the unstructured event record corresponds.

15. The computing system of claim 14 wherein the instructions configure the computing system to:
determine that the activity pattern comprises an unstructured activity pattern; and
determine whether the unstructured event record is part of the unstructured activity pattern.

16. The computing system of claim 15 wherein the instructions configure the computing system to:
determine whether the unstructured event record represents an anomaly in the unstructured activity pattern.

17. The computing system of claim 16 wherein the instructions configure the computing system to:
generate the representation of the user interface display to include a recommendation, the recommendation being based on a determination that the unstructured event record represents an anomaly.

18. A computer implemented method, comprising:
detecting an unstructured event in a computing system, the unstructured event comprising an event other than a structured event that has a predefined event type and is configured to occur according to a predefined workflow associated with the computing system;
extracting information indicative of the unstructured event to generate an unstructured event record;
classifying the unstructured event record to identify a corresponding event type;

accessing a process model and a set of logged computing system processes to identify a process;
based on the unstructured event record, determining that the unstructured event corresponds to the identified process;
identifying a workflow in the computing system based on the identified process and the identified event type corresponding to the unstructured event record;
identifying an anomaly in an activity pattern based on the identified process;
modifying the workflow based on the identified anomaly; and
generating a representation of a user interface display that includes the modified workflow.

19. The computer implemented method of claim 18, wherein the activity pattern comprises a series of executed events corresponding to a given user, and further comprising:
   determining whether the unstructured activity record represents the anomaly in the activity pattern;
   based on the determination, automatically identifying a recommended action that, when executed by the computing system, addresses the anomaly; and
   modifying the representation of the user interface display to represent the recommended action.

20. The computer implemented method of claim 18 and further comprising:
   accessing a case identifier (ID) conflation model to assign the unstructured event record to a case ID within the computer system.

* * * * *